United States Patent [19]

Takahashi et al.

[11] Patent Number: 5,674,625
[45] Date of Patent: Oct. 7, 1997

[54] MULTILAYERED WATER-REPELLENT FILM AND METHOD OF FORMING SAME ON GLASS SUBSTRATE

[75] Inventors: Osamu Takahashi, Suzuka; Shigeo Hamaguchi, Matsusaka; Michitaka Otani, Matsusaka; Yoshihiro Nishida, Matsusaka; Ichiro Nakamura, Yokohama; Satoko Sugawara, Yokosuka; Takeshi Kondo; Yoshinori Akamatsu, both of Matsusaka; Yasuaki Kai, Yokohama, all of Japan

[73] Assignees: Central Glass Company, Limited, Ube; Nissan Motor Co., Ltd., Kanagawa-ku, both of Japan

[21] Appl. No.: 338,135

[22] Filed: Nov. 9, 1994

[30] Foreign Application Priority Data

Nov. 10, 1993 [JP] Japan ................................. 5-281193
Mar. 31, 1994 [JP] Japan ................................. 6-063449

[51] Int. Cl.$^6$ ........................................... B32B 17/06
[52] U.S. Cl. .......................... 428/428; 428/142; 428/156; 428/172; 428/428; 428/429; 428/432; 428/446; 428/447; 428/701; 428/702
[58] Field of Search ..................................... 428/426, 428, 428/429, 432, 688, 689, 701, 702, 446, 447, 141, 142, 156, 164, 172; 427/226, 376.2, 393.5, 419.1, 419.2, 419.3, 419.8; 106/286.1, 286.2, 286.4, 287.13, 287.14

[56] References Cited

U.S. PATENT DOCUMENTS

| | | | |
|---|---|---|---|
| 3,958,073 | 5/1976 | Trevisan | 428/427 |
| 4,948,760 | 8/1990 | Ohwaki | 501/54 |
| 5,073,195 | 12/1991 | Cuthbert | 106/2 |
| 5,250,322 | 10/1993 | Takahashi | 427/226 |
| 5,266,358 | 11/1993 | Uemura | 427/376.2 |
| 5,268,198 | 12/1993 | Yamasaki | 427/226 |
| 5,413,865 | 5/1995 | Nakamura | 428/432 |

FOREIGN PATENT DOCUMENTS

| | | |
|---|---|---|
| 0476510 | 9/1991 | European Pat. Off. . |
| 0545258 | 11/1992 | European Pat. Off. . |
| 5 186 718 | 7/1993 | Japan . |
| 5 213 633 | 8/1993 | Japan . |
| 5 239 409 | 9/1993 | Japan . |
| 5 311 156 | 11/1993 | Japan . |
| 5 345 641 | 12/1993 | Japan . |

OTHER PUBLICATIONS

Abst. "Sol–Gel Film and Its Formation", vol. 18, No. 140, (C–1177), JP-5 319 869, Mar. 12, 1993, (Nissan Motor Co., Ltd.).

(List continued on next page.)

Primary Examiner—Ellis Robinson
Assistant Examiner—Timothy M. Speer
Attorney, Agent, or Firm—Keck, Mahin & Cate

[57] ABSTRACT

The invention relates to a multilayered water-repellent film formed on a glass substrate by the sol-gel process. The film has a first metal oxide layer which is formed on the glass substrate by the sol-gel process and a second water-repellent layer formed on the first layer. As a first method for providing the film with superior durability of water repellency, mechanical strength and chemical resistance, the first layer is prepared by using a mixture of three specific sols which are respectively prepared from metal alkoxides or metal acetylacetonates. As a second method for providing the film with the above advantages, the second layer is prepared by using a coating mixture comprising a fluoroalkylsilane, tin oxide particles doped with antimony oxide, a silicon compound, water and an organic solvent. As a third method for providing the film with the above advantages, the second layer is prepared by using another coating mixture comprising a fluoroalkylsilane, tin oxide particles doped with antimony oxide, a silicon compound, water, an organic solvent and an acid.

12 Claims, 5 Drawing Sheets

OTHER PUBLICATIONS

Abst. "Water–Repellent Oxide Film and Its Formation", vol. 18 No. 219 (C–1192), JP 601 6455, Jan. 25, 1994, (Nissan Motor Co.).

Database WPI, Derwent Publications Ltd., London, GB; 93–081–179 & JP A–5 024 886 (Nissan Motor Co.), Feb. 2, 1993 abst.

Database WPI, Derwent Publications, Ltd., (Central Glass Co. & Nissan Motor Co.), 94–061909, JP 601 6455,.

MULTILAYERED WATER-REPELLENT FILM AND METHOD OF FORMING SAME ON GLASS SUBSTRATE

BACKGROUND OF THE INVENTION

The present invention relates to a multilayered water-repellent film, and a method of forming the film on a glass substrate. The film-forming method belongs to the sol-gel process. The water-repellent coating is suitable for application, for example, to vehicular and architectural window glasses which are to be exposed to rain water.

Hitherto, there have been various proposals to provide a glass substrate with water repellency. For example, there have been proposed water-repellent agents to be applied to a glass substrate surface, each of which contains a silane compound having a polyfluoroalkyl group or a condensate of the partially hydrolyzed silane compound (see JP-A-58-122979, JP-A-58-142958, JP-A-58-147483, JP-A-58-172242, JP-A-58-172243, JP-A-58-172245, JP-A-58-172246, JP-A-58-190840 and JP-A-58-223634). JP-A-58-167448 discloses a reflectance reducing agent which contains a silane compound having a polyfluoroalkyl group or a condensate of the partially hydrolyzed silane compound.

JP-A-58-129082 and JP-A-58-172244 disclose, as water-repellent agents, silicone block oligomers each having a polyfluoroalkyl group.

JP-A-5-345641 discloses a method of forming a water-repellent film on a glass substrate. This method comprises the steps of: (a) applying a mixture to the glass substrate and (b) baking the coated glass substrate in an atmosphere containing fluoroalkylsilane vapor so as to increase the fluoroalkyl content of the water-repellent film. This mixture contains a metal alkoxide, a substituted metal alkoxide in which alkoxyl groups are partially replaced with fluoroalkyl groups, an alcohol, water, and an acid or a base.

JP-3-90345 discloses a high refractive index dielectric layer formed on a transparent substrate and a low refractive index layer formed on the dielectric layer. This dielectric layer contains inorganic fine particles which may be tin oxide doped with antimony. The low refractive index layer is prepared from a mixture containing a fluoroalkyl-containing compound, a silicon compound, an alcohol and an acid.

However, the above publications' proposals do not provide glass substrates with water-repellent and/or reflectance reducing films which are superior in durability and weatherability tests.

There is a glass substrate coated with a film of Teflon (a trade name). However, this film is soft and thus tends to have scratches thereon. With this, the film becomes opaque.

JP-A-5-51238 discloses a water-repellent film formed on a glass substrate. This film (2) has a metal oxide phase (21) and water-repellent fine particles (22) dispersed in the metal oxide phase (21). However, this film has a problem that it tends to have scratches thereon.

JP-63-117933 discloses a method of providing a glass substrate with water repellency. This method comprises irradiating the glass substrate with at least one ion of at least one element selected from the group containing Sn and Sb. JP-A-4-160039 discloses a similar method of providing a glass substrate with water repellency. This method comprises the steps of: (a) forming a metal oxide film on the glass substrate and (b) irradiating the film's surface with at least one ion of at least one element selected from the group containing Sn and Sb for providing the film with water repellency. However, according to these two methods, the initial contact angle of water drop on the film does not become sufficiently large, and the ion will be gradually oxidized and thus water repellency does not last for a long time.

There are provided proposals to form on a glass substrate a multilayered water-repellent film having a first layer adherent to the glass substrate and a water repellent second layer formed on the first layer.

For example, JP-A-60-231442 discloses a water-repellent film having a first layer of a first polymer of a first organic silicon compound having a siloxane bond and a second layer of a second or third polymer. The second polymer is prepared from a second organic silicon compound which contains more carbon or less oxygen than that of the first organic silicon compound. The third polymer is prepared from a fluorine compound. However, this film tends to have scratches thereon.

JP-A-3-153859 discloses a water-repellent film formed on a plastic substrate. This film has a first metal oxide layer formed on the plastic substrate and a second layer of a mixture of a metal oxide and a fluorine-containing resin. However, adhesion of this film to the substrate is inferior because the substrate is plastic.

JP-A-2-311332 discloses a method of a water-repellent film on a glass substrate. This method comprising the steps of: (a) forming a metal oxide layer on the glass substrate; and (b) treating the metal oxide layer with at least one silyl compound which is selected from the group consisting of chlorosilyl compounds, alkoxysilane compounds and fluoroalkylsilane compounds. JP-A-5-238781 discloses another water-repellent film having a first layer of $SiO_2$ and a second layer of perfluoroalkylalkylsilane. However, these water-repellent films are not sufficient in durability of water repellency in a severe environment.

To increase adhesion between the first and second layers of a water-repellent film, there have been proposed some conventional methods to make the first layer's surface minutely rough. For example, JP-A-4-124047 discloses a method of forming a water-repellent film having first and second layers. This method comprises the steps of: (a) forming the first metal oxide layer on a glass substrate; (b) etching the first layer so as to make the first layer's surface minutely rough; and (c) forming on the first layer the water repellent second layer. JP-A-6-116430 discloses another method of forming a water-repellent film having first and second layers. This method comprises the steps of: (a) forming the first layer such as $SiO_2$ film on a plastic film; (b) etching the first layer by plasma discharge so as to make the first layer's surface minutely rough; and (c) forming the second layer (a chemical adsorption monomolecular layer containing fluorine) on the first layer through siloxane bonds. However, according to these methods, the processes to make the first layer's surface minutely rough are complicated. Furthermore, according to these methods, the configuration or roughness of the etched surface of the first layer is inferior to sufficiently increase adhesion between the first and second layers. Thus, the water-repellent films according to these methods are not satisfactory in durability of water repellency in a severe environment.

Another example is making the first layer's surface minutely rough by the thermal decomposition of an organic polymer added to a metal alkoxide solution. However, this method has the following drawback. Micro-pits which make the first layer minutely rough tend to disappear by the densification of the first layer after baking at a temperature not lower than 400° C. This tends to make the first layer relatively flat.

JP-A-5-147976 discloses a method of forming on a glass substrate a metal oxide film having a minutely rough surface. This method belongs to the sol-gel process. In this method, a coating solution comprises at least two sols prepared from at least one compound selected from the group consisting of metal alkoxides and metal acetylacetonates. The at least two sols, i.e. at least two polymers thereof, have different average molecular weights. This method provides a metal oxide film which has a minutely rough surface having numerous micro-pits thereon.

JP-A-6-16455 discloses a method of forming on a glass substrate a multilayered metal oxide film having first and second metal oxide layers. In this method, a first coating solution which is similar to the coating solution of SP-A-5-147976 is used for providing the first layer with a minutely rough surface having numerous micro-pits thereon. Furthermore, a second coating solution which contains a silane compound having a fluorocarbon group is used in this method for forming on the first layer the second water-repellent layer. This method provides a multilayered metal oxide film which is durable in water repellency.

However, a recent demand has been increasing for a multilayered water-repellent film which is more superior in durability of water repellency, mechanical strength and chemical resistance even in a severe environment.

SUMMARY OF THE INVENTION

It is therefore an object of the present invention to provide an improved multilayered water-repellent film which is more superior in durability of water repellency, mechanical strength and chemical resistance in a severe environment than conventional water-repellent films.

It is another object of the present invention to provide an improved method of forming the multilayered water-repellent film on a glass substrate.

According to a first aspect of the present invention, there is provided a multilayered water-repellent film having a first metal oxide layer and a second water-repellent layer, the film being prepared in accordance with a method comprising the steps of:

(a) preparing a first sol through hydrolysis and polycondensation of a first compound so as to disperse a first polymer of the first compound in the first sol, the first compound being selected from the group consisting of tetrafunctional metal alkoxides and tetrafunctional metal acetylacetonates;

(b) preparing a second sol which is one of a type-A second sol and a type-B second sol, the type-A second sol being prepared through hydrolysis and polycondensation of a second compound so as to disperse a second polymer of the second compound in the type-A second sol, the second compound being selected from the group consisting of metal alkoxides which are trifunctional or bifunctional and metal acetylacetonates which are trifunctional or bifunctional, the metal type of the second compound being the same as that of the first compound, the type-B second sol being prepared through hydrolysis and polycondensation of a third compound so as to disperse a third polymer of the third compound in the type-B second sol and through inactivation of an end functional group of the third polymer, the third compound being selected from the group consisting of tetrafunctional metal alkoxides and tetrafunctional metal acetylacetonates;

(c) preparing a third sol through hydrolysis and polycondensation of a fourth compound so as to disperse a fourth polymer of the fourth compound in the third sol, the fourth compound being selected from the group consisting of metal alkoxides and metal acetylacetonates, the metal type of the fourth compound being different from that of the first and second compounds;

(d) mixing the first, second and third sols together with a solvent to form a first coating mixture;

(e) applying the first coating mixture to the glass substrate so as to form a first sol film on the glass substrate;

(f) heating the first sol film so as to transform the first sol film into a first gel film and then into the first metal oxide layer which has a minutely rough surface having on the surface micro-pits and/or micro-projections; and (g) forming the second water-repellent layer on the first metal oxide layer.

As is mentioned hereinabove, according to the first aspect of the present invention, there is provided a multilayered water-repellent film having a first metal oxide layer having a minutely rough surface and a second layer which is water-repellent. This first layer is in accordance with the present invention, but this second layer may be a conventional water-repellent layer. It should be noted that this multilayered water-repellent film is more superior in durability of water repellency, mechanical strength and chemical resistance than conventional water-repellent films.

According to the first aspect of the present invention, the contact area between the first and second layers becomes substantially large because the first layer's surface is desirably minutely rough. Furthermore, even if the first layer is baked at a high temperature, for example, not lower than 500° C., the minutely rough condition of the first layer is stable. Thus, adhesion between the first and second layers is substantially enhanced. With this, as will be shown in the aftermentioned Examples 1–3 and Table 1 of the present application, the multilayered film according to the first aspect of the present invention becomes superior in durability of water repellency and mechanical strength.

In contrast to this, it is understood that a conventional multilayered film according to the aftermentioned Comparative Example 3 of the present application is inferior in durability of water repellency and mechanical strength, as shown in Table 1. In fact, the first metal oxide layer of this film is etched so as to make the first layer minutely rough. The second layer is a conventional water-repellent film which is the same as that of Examples 1–3. Therefore, it can be concluded that the difference of the results shown in Table 1 between Examples 1–3 and Comparative Example 3 is caused by the difference of the first metal oxide layer itself. In other words, it can be concluded that the first layers according to Examples 1–3 are materially different from the first layer of Comparative Example 3. That is, it can be concluded that the surface configuration or surface roughness of the first layers according to Examples 1–3 are different from that of the first layer according to Comparative Example 3.

FIG. 1 is a schematic perspective view of the surface roughness of a first metal oxide layer according to the present invention. It is understood that this first layer's surface has thereon numerous micro-pits and/or micro-projections. In contrast, FIG. 2 is a schematic perspective view of the surface roughness of a conventional first metal oxide layer which has been etched. From these figures, it is easily understood that this first layer according to the present invention is materially different from this conventional first layer.

Furthermore, it is understood that another conventional multilayered film according to the aftermentioned Comparative Example 1 of the present application is inferior in durability of water repellency and mechanical strength, as shown in Table 1. In fact, the first metal oxide layer of Comparative Example 1 is made minutely rough by using only two different sols (the first and second sols). The second layer is a conventional water-repellent film which is the same as that of Examples 1–3. Therefore, it can be also concluded that the difference of the results shown in Table 1 between Examples 1–3 and Comparative Example 1 is caused by the difference of the first metal oxide layer itself. In other words, it can be concluded that the first layers according to Examples 1–3 are materially different from the first layer according to Comparative Example 1. That is, it can be concluded that the surface configuration or surface roughness of the first layers according to Examples 1–3 are different from that of the first layer according to Comparative Example 1.

According to a second aspect of the present invention, there is provided a multilayered water-repellent film having a first metal oxide layer and a second water-repellent layer, the film being prepared in accordance with a method comprising the steps of:

(a) forming the first metal oxide layer on the glass substrate such that the first metal oxide layer has a minutely rough surface having on the surface micro-pits and/or micro-projections;

(b) preparing a coating mixture comprising 0.10–20 wt % of a fluoroalkylsilane, 0.10–2 wt % of tin oxide particles doped with antimony oxide, 0.10–2 wt % of a silicon compound, water and an organic solvent;

(c) applying the coating mixture to the first metal oxide layer so as to form the second layer on the first layer; and (d) heating the second layer at a temperature ranging from 100° to 300° C.

According to a third aspect of the present invention, there is provided a multilayered water-repellent film having a first metal oxide layer and a second water-repellent layer, the film being prepared in accordance with a method comprising the steps of:

(a) forming the first metal oxide layer on the glass substrate such that the first metal oxide layer has a minutely rough surface having on the surface micro-pits and/or micro-projections;

(b) preparing a coating mixture comprising 0.10–20 wt % of a fluoroalkylsilane, 0.04–2 wt % of tin oxide particles doped with antimony oxide, 0.03–2 wt % of a silicon compound, 0.005–15 wt % of water, an organic solvent and an acid, the molar ratio of the acid to the fluoroalkylsilane being in a range from $5.0 \times 10^{-4}$:1 to $2.0 \times 10^{-2}$:1;

(c) applying the coating mixture to the first metal oxide layer so as to form the second layer on the first layer; and (d) heating the second layer at a temperature ranging from 100° to 400° C.

As is mentioned hereinabove, according to each of the second and third aspects of the present invention, there is provided a multilayered water-repellent film having a first metal oxide layer having a minutely rough surface and a second water-repellent layer. This second layer is in accordance with the present invention, but this first metal oxide layer may be a conventional metal oxide layer having a minutely rough surface, for example, which is disclosed in JP-A-6-16455. It should be noted that the multilayered water-repellent films of the second and third aspects of the present invention are also more superior in durability of water repellency, mechanical strength and chemical resistance than conventional water-repellent films.

According to the present invention, it is optional to combine the first metal oxide layer of the first aspect of the present invention with the second water-repellent layer of the second or third aspect of the present invention to form a multilayered water-repellent film on a glass substrate. This combination is disclosed in the aftermentioned Examples 21–22 of the present application. It should be noted that this multilayered water-repellent film of the present invention is also more superior in durability of water repellency, mechanical strength and chemical resistance than conventional water-repellent films.

It should be noted that the multilayered film according to the present invention is high in transparency and hardness.

DESCRIPTION OF THE PREFERRED EMBODIMENTS

Figure 1:
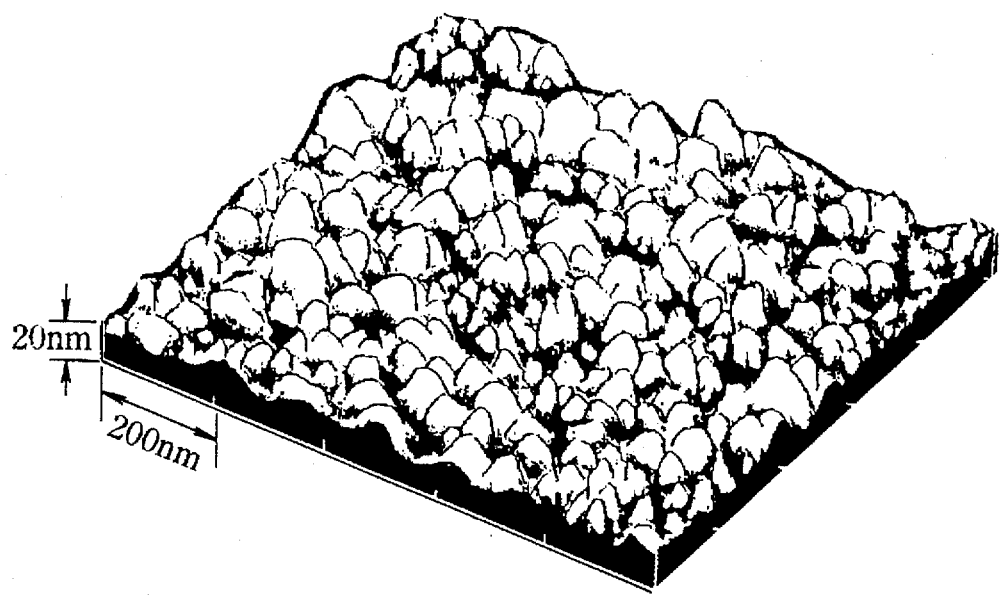
FIG. 1 is a schematic perspective view showing a surface roughness of a first layer in accordance with the present invention.

According to the present invention, there is provided a multilayered water-repellent film having a first metal oxide layer and a second water-repellent layer, and a method of forming the film on a glass substrate. This glass substrate may be colorless or colored as long as it is transparent. The glass substrate may be flat or curved in shape, or a tempered one. This method includes the steps of:

(a) preparing a first coating mixture;

(b) applying the first coating mixture to the glass substrate so as to form a first sol film on the glass substrate;

(c) heating the first sol film so as to transform the first sol film into the first metal oxide layer which has a minutely rough surface having thereon numerous micro-pits and/or micro-projections;

(d) preparing a second coating mixture;

(e) applying the second coating mixture to the first metal oxide layer so as to form thereon a second layer; and (f) heating the second layer.

It is preferable that the applications of the first and second coating mixture are conducted in an atmosphere of a temperature within a range or from 20° to 27° C. and a relative humidity within a range of from 40 to 65%.

According to the first aspect of the present invention, the multilayered water-repellent film has an improved first metal oxide layer which is in accordance with the present invention and a second layer which may be a conventional water-repellent layer. This combination of the first and second layers provides the multilayered film with superior durability of water repellency, mechanical strength and chemical resistance.

The features of the first aspect of the present invention will be described in the following.

The first coating mixture according to the first aspect of the present invention is prepared by mixing at least three sols, i.e. first, second and third sols, together with a solvent.

The first sol is prepared through hydrolysis and polycondensation of a metal alkoxide or a metal acetylacetonate, each of which is tetrafunctional. A tetrafunctional metal alkoxide according to the first aspect of the present invention is a simple alkoxide having no organic group other than alkoxyl groups, such as a methoxide, an ethoxide, an isopropoxide or the like. A tetrafunctional metal acetylacetonate according to the first aspect of the present invention is either a simple acetylacetonate having no organic group other than acetylacetone groups, or an acetylacetonate in which at least one alkoxyl group or the like has been substituted for at least one acetylacetone group. It is preferable to use Si, Ti or Zr as a metal of the alkoxide or the acetylacetonate. Preferable examples of the alkoxide and the acetylacetonate of this type are tetramethoxysilane [Si (OCH$_3$)$_4$], tetraethoxysilane [Si(OC$_2$H$_5$)$_4$], titanium tetraisopropoxide [Ti(O-iso-C$_3$H$_7$)$_4$], zirconium n-butoxide [Zr (O-n-C$_4$H$_9$)$_4$], and zirconium acetylacetonate [Zr (CH$_2$COCH$_2$COCH$_3$)$_4$].

The second sol is one of A-type second sol and B-type second sol. That is, either the A-type sol or the B-type sol can be used as the second sol. The A-type second sol is prepared through hydrolysis and polycondensation of a metal alkoxide or a metal acetylacetonate, each of which is trifunctional or bifunctional. In the alkoxide or the acetylacetonate of this type, methyl group, ethyl group or the like has been substituted for at least one alkoxyl group or at least one acetylacetonate group. Preferable examples of the alkoxide and the acetylacetonate of this type are methyltriethoxysilane [CH$_3$Si(OC$_2$H$_5$)$_3$], methyltrimethoxysilane [CH$_3$Si(OCH$_3$)$_3$], dimethyldiethoxysilane [(CH$_3$)$_2$Si (OC$_2$H$_5$)$_2$] and dimethyldimethoxysilane [(CH$_3$)$_2$Si(OCH$_3$)$_2$]. It is necessary that the metal type of the A-type second sol is the same as that of the first sol.

The B-type second sol is prepared by hydrolyzing and polycondensing a metal alkoxide or a metal acetylacetonate, each of which is tetrafunctional, and then by inactivating an end functional group of the polymer (colloidal particles) of the sol. This inactivation is conducted, for example, by replacing the end functional group with another inactive group. Unlike the A-type second sol, the metal type of the B-type second sol is not particularly limited.

The third sol is prepared through hydrolysis and polycondensation of a metal alkoxide or a metal acetylacetonate, of which metal type is different from that of the first sol and the type-A second sol. Functionality of the alkoxide or the acetylacetonate of the third sol is not particularly limited. That is, either one of tetrafunctional, trifunctional and bifunctional metal alkoxides and metal acetylacetonates may be used for the preparation of the third sol.

In the first aspect of the present invention, it is a very important feature that the first, second and third sols are mixed together for the preparation of the first metal oxide layer. With this, the first metal oxide layer's surface becomes desirably minutely rough to have numerous micro-pits and/ or micro-projections (see FIG. 1). With this, adhesion of the second water-repellent layer to the first metal oxide layer is substantially improved. Thus, the multilayered film becomes superior in mechanical strength, chemical resistance, transparency, hardness and durability of water repellency. Each of the first, second and third sols is stable, i.e. hard to gel under a normal storage condition, relatively cheap in price and easily available and can be easily prepared.

For example, in case that the first sol, the type-A second sol and the third sol are mixed together for the preparation of the first coating mixture, the first sol contributes to construct a three dimensional structure of —Si—O—Si— (vertical two lines from each Si is omitted in this structure) because it is tetrafunctional. In contrast, the type-A second sol does not contribute to construct this three dimensional structure because it is trifunctional or bifunctional. Thus, the mixture of the first sol and the type-A second sol contributes to make the structure of the first metal oxide layer uneven and thus to make the first metal oxide layer's surface minutely rough. As is mentioned hereinabove, the metal type of the third sol is different from that of the first sol and the type-A second sol. Therefore, the addition of the third sol to the mixture of the first sol and the type-A second sol contributes to make the first metal oxide layer compact and thus to make the multilayered metal oxide film superior in mechanical strength and chemical resistance.

Alternatively, in case that the first sol, the type-B second sol and the third sol are mixed together for the preparation of the first coating mixture, the end functional group of the type-B sol is inactivated. Therefore, similar to the type-A sol, the type-B sol does not contribute to construct the above three dimensional structure either. Thus, the mixture of the first sol and the type-B second sol also contributes make the first metal oxide layer's surface minutely rough. The addition of the third sol to the mixture of the first sol and the type-B second sol also contributes to make the first metal oxide layer compact and thus to make the multilayered metal oxide film superior in mechanical strength and chemical resistance.

For the purpose of making the first layer's surface desirably minutely rough, it is preferable that each of the average molecular weights of the polymers (colloidal particles) of the first and second sols is in the range of from 100 to 1,000,000. It is more preferably from 1,000 to 100,000. If it is less than 100, crawling of the first coating solution tends to occur when the first coating solution is applied to a glass substrate. If it is greater than 1,000,000, the first and second sols tend to turn into gels in a relatively short time. In contrast, it should be noted that the average molecular weight of the polymer of the third sol is not limited at all for making the first layer's surface desirably minutely rough.

The type of solvent for the preparation of the first, second and third sols is not particularly limited in the present invention. However, the surface roughness of the first layer somewhat changes depending on the type of the solvent for the first and second sols. Preferable examples of the solvent are lower alcohols such as methyl alcohol, ethyl alcohol, isopropyl alcohol and n-butanol, ethyl acetate and ethyleneglycol monoethyl ether.

It is preferable that the molar ratio of the solid matter (polymer) contained in the second sol to that contained in the first sol is in the range of from about 0.03:1 to about 30:1. If this ratio is less than 0.03 or greater than 30, the configuration of the first layer's surface does not become desirably minutely rough but becomes relatively flat. This ratio is more preferably in the range of from about 0.5:1 to about 15:1.

It is preferable that the molar ratio of the solid matter contained in the third sol to the total of the solid matters contained in the first and second sols is in the range of from 0.01:1 to 1:1.

It may be desirable to control the relative humidity of the atmosphere where the multilayered water-repellent film is formed on a glass substrate, within a range of from about 20 to 80% for controlling the configuration of the first layer's surface and the diameters of micro-pits and/or micro-projections.

The type of solvent for diluting the mixture of the first and second sols is not particularly limited in the present invention. Examples of this solvent are lower alcohols such as methyl alcohol, ethyl alcohol, isopropyl alcohol and n-butanol, acetone and ethyl acetate.

It is preferable that the viscosity of the first coating mixture is controlled within the range of from 1 to 10 cP. If it is less than 1 cP, the viscosity becomes too low. With this, it is difficult to form a film of the first coating mixture on a glass substrate. If it is greater than 10 cP, the film thickness tends to become too thick. With this, the film tends to have cracks while it is heated.

It is preferable that the solid matter concentration of the first coating mixture is controlled within a range of from 0.01 to 10 wt % on a metal oxide basis. If it is less than 0.01 wt %, the first coating mixture becomes too thin in solid matter concentration. With this, it is difficult to form a film of the first coating mixture on a glass substrate. If it is greater than 10 wt %, the film tends to become too thick in thickness. With this, the film tends to have cracks.

As the coating method of the first and second coating solutions, it is usual to use dip coating, spraying, flow coating or spin coating.

The first sol film of the first coating mixture is heated preferably at a temperature of at least 100° C., more preferably at least about 500° C. and still more preferably at least about 600° C. so as to transform the first sol film into the first gel film and then into the first metal oxide layer which is superior in mechanical strength. It should be noted that the minutely rough configuration of the first layer's surface does not disappear even after the baking of at least 500° C.

For the preparation of the second coating mixture, a conventional water-repellent agent may be used and mixed with a solvent. Examples of the water-repellent agent are organic silicon compounds such as hydrolysates of trimethylmethoxysilane, dimethyldimethoxysilane, trimethylethoxysilane, dimethyldiethoxysilane, diethyldiethoxysilane and diethyldimethoxysilane; fluororesins such as polytetrafluoroethylene, polytrichlorofluoroethylene, polyvinylidenefluoride, polyvinylfluoride, copolymer of tetrafluoroethylene and hexafluoropropylene, and copolymer of tetrafluoroethylene and ethylene; mixtures of the organic silicon compounds and the fluororesins; and silane compounds containing a fluorocarbon group, such as $CF_3CH_2CH_2Si(OCH_3)_3$, $CF_3(CF_2)_5CH_2CH_2Si(OCH_3)_3$, $CF_3(CF_2)_7CH_2CH_2Si(OCH_3)_3$, $CF_3(CF_2)_7CH_2CH_2CH_3Si(OCH_3)_2$, $CF_3(CF_2)_7CH_2CH_2SiCl_3$ or a partial hydrolysate of these silane compounds.

This second coating mixture is applied to the first metal oxide layer so as to form thereon a second film. Then, this second film is dried preferably at a temperature ranging from room temperature to 400° C. The second film is dried more preferably at a temperature ranging from 140° to 350° C.

The following nonlimitative Examples 1 to 3 are in accordance with the first aspect of the present invention, and the following Comparative Examples 1 to 3 are not in accordance with the first aspect of the present invention.

EXAMPLE 1

A multilayered water-repellent film consisting of a first metal oxide layer and a second water-repellent layer was formed on a glass substrate in accordance with the following steps.

Firstly, a clear float glass substrate about 100 mm square in widths and about 2 mm in thickness was washed with neutral detergent, then with water and then with an alcohol. After drying the glass substrate, it was cleaned with acetone.

Separately, 16 g of tetraethoxysilane, 8.5 g of ethanol and 5.5 g of water of which pH value had previously adjusted to 4 using HCl were mixed together. This mixture was refluxed at a temperature of about 80° C. for about 20 hr so as to prepare a first sol. The polymer of the first sol had an average molecular weight of about 40,000 on a polystyrene basis.

Then, 36.6 g of methyltrimethoxysilane, about 28.9 g of isopropyl alcohol and 14.5 g of pure water having a pH value of 7 were mixed together. This mixture was refluxed at a temperature of about 70° C. for about 5 hr so as to prepare a second sol. The polymer of the second sol had an average molecular weight of about 2,000.

Then, 2.8 g of titanium tetrapropoxide, 46.6 g of isopropyl alcohol and 0.6 g of water having a pH value of 2 were mixed together. This mixture was stirred at room temperature for about 30 min so as to prepare a third sol.

Then, the first and second sols were mixed together. This mixture was diluted with about 300 g of isopropyl alcohol. This diluted mixture was stirred at room temperature for about 10 hr. Then, the third sol was added to this mixture, and stirring was conducted at room temperature for about 30 min. With this, a first coating solution was prepared. The molar ratio of the solid matter (polymer) contained in the second sol to that contained in the first sol was 3.5:1 on a metal oxide basis. The molar ratio of the solid matter contained in the third sol to the total of the solid matters contained in the first and second sols was 0.45:4.5 on a metal oxide basis.

Figure 3:
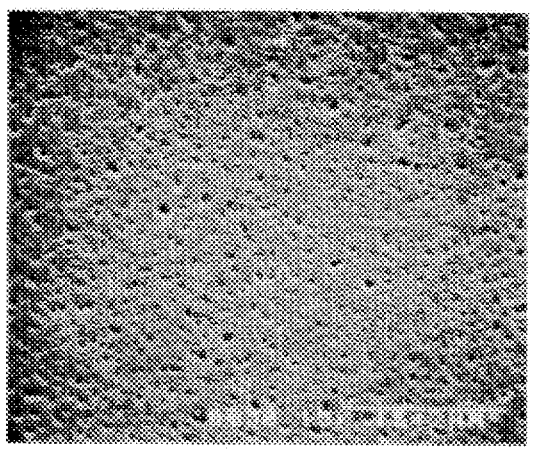
FIGS. 3 to 5 are photographs taken through a scanning electron microscope (SEM) of about 20,000 magnifications, showing surface roughness of the first layers formed on glass substrates in accordance with Examples 1 to 3 of the present invention, respectively.

Then, the first coating solution was applied to the glass substrate by dip coating in an atmosphere of a temperature of about 23° C. and a relative humidity of about 50% so as to form thereon a first sol film. The thus coated glass substrate was allowed to stand for drying the first sol film. With this, it was turned into a first gel film of a mixture of $SiO_2$ and $TiO_2$ having a thickness of about 200 nm. Then, the first gel film was heated at a temperature of about 100° C. for about 30 min and then at a temperature of about 600° C. for about 10 min. With this, a first metal oxide layer of a mixture of $SiO_2$ and $TiO_2$ having a thickness of about 100 nm was formed on the glass substrate. As is shown in FIG. 3, it was found by the observation with SEM that the first metal oxide layer's surface was minutely rough and had numerous micro-pits.

Then, a conventional second layer was formed on the first layer in accordance with the following steps.

Firstly, 1 g of heptadecatridecylfluoroalkylsilane, $CF_3(CF_2)_7CH_2CH_2Si(OCH_3)_3$, was mixed with about 50 g of isopropyl alcohol and 1 g of 60% nitric acid in a beaker. This mixture was sufficiently stirred at room temperature so as to partially hydrolyze the fluoroalkylsilane. The thus prepared second coating solution was applied to the first metal oxide layer in the same atmosphere as that of the application of the first coating solution. Then, the glass substrate was put in an electric furnace of about 140° C. for about 30 min. With this, the second water-repellent layer was formed on the first metal oxide layer.

The thus formed glass substrate having thereon the multilayered water-repellent film was subjected to the following tests.

To evaluate water repellency of the film, the contact angle of water drop on the film was measured by a contact angle meter in the atmosphere of a temperature of about 25° C.

Durability of the multilayered film was evaluated by an durability test using a practical wiper blade for an automobile window. Under a load of about 15 g/cm, the wiper blade was kept in contact with the film on the glass substrate and moved reciprocatively until it made about 180,000 successive rubbing passes. One reciprocation was counted as one pass. Tap water was dropped to the film during this test. After this test, the film surface was observed with an interference microscope of about 50 magnification to check whether or not the film surface has scratches thereon. The degree of durability of the film was valued by the amount of a change in the contact angle of water drop from the contact angle before this test. The results are shown in Table 1.

Weatherability of the multilayered film was evaluated by a super UV accelerated weatherability test. In this test, the film was exposed to light rays of about 50 mW/cm$^2$ for about 2,000 hr at a temperature of about 23° C. and a relative humidity of about 50% with a distance of about 25 mm between a lamp and the film. The degree of weatherability of the film was valued by the amount of a change in the contact angle of water drop from the contact angle before the weatherability test. The result is shown in Table 1.

Each of the glass substrates having thereon the multilayered water-repellent films in accordance with the following Examples 2–3 and Comparative Examples 1–3 was also subjected to the same tests of Example 1. The results are shown in Table 1.

EXAMPLE 2

In this example, Example 1 was repeated except that the molar ratios between the solid matters contained in the first, second and third sols of Example 1 were changed. In fact, the first and second sols of Example 1 were mixed together such that the molar ratio of the solid matter contained in the second sol to that contained in the first sol was adjusted to 7:1 on a metal oxide basis. Then, the third sol of Example 1 was added to this mixture such that the molar ratio of the solid matter contained in the third sol to the total of the solid matters contained in the first and second sols was adjusted to 0.8:8 on a metal oxide basis.

Figure 4:
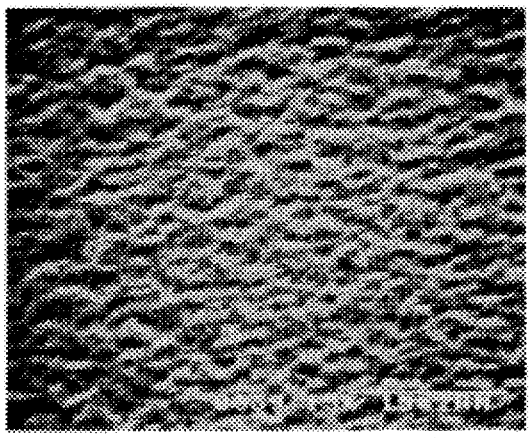

As is shown in FIG. 4, it was found by the observation with SEM that the first metal oxide layer's surface was minutely rough and had numerous micro-pits and micro-projections.

EXAMPLE 3

In this example, Example 1 was repeated except that the molar ratios between the solid matters contained in the first, second and third sols of Example 1 were changed. In fact, the first and second sols of Example 1 were mixed together such that the molar ratio of the solid matter contained in the second sol to that contained in the first sol was adjusted to 11:1 on a metal oxide basis. Then, the third sol of Example 1 was added to this mixture such that the molar ratio of the solid matter contained in the third sol to the total of the solid matters contained in the first and second sols was adjusted to 1.2:12 on a metal oxide basis.

Figure 5:
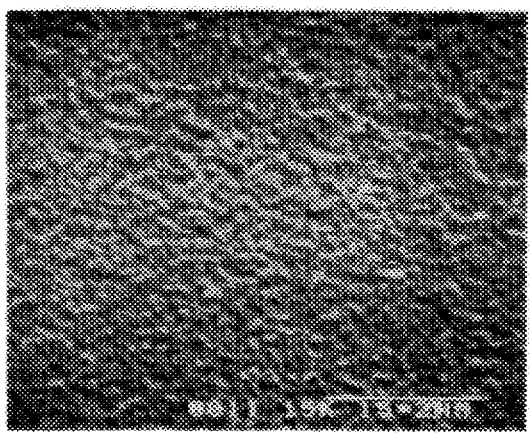

As is shown in FIG. 5, it was found by the observation with SEM that the first metal oxide layer's surface was minutely rough and had numerous micro-projections.

COMPARATIVE EXAMPLE 1

In this comparative example, Example 1 was repeated except that the third sol of Example 1 was omitted in the preparation of the first metal oxide layer. In fact, the first and second sol of Example 1 were mixed together such that the molar ratio of the solid matter contained in the second sol to that contained in the first sol was adjusted to 3.5:1 on a metal oxide basis. Then, this mixture was diluted with 350 g of isopropyl alcohol.

Figure 6:
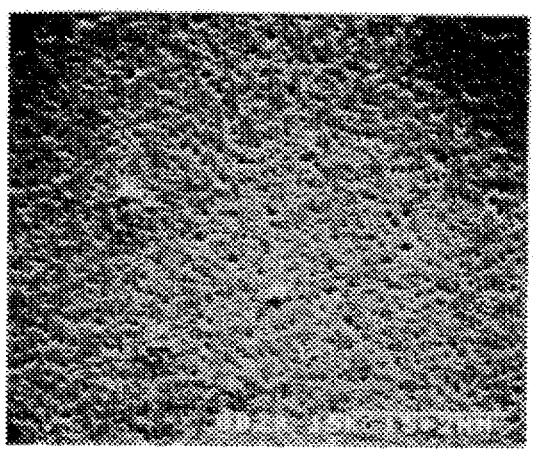
FIGS. 6 to 8 are photographs similar to FIGS. 3 to 5, but showing surface conditions of the first layers in accordance with Comparative Examples 1 to 3, respectively.

As is shown in FIG. 6, it was found by the observation with SEM that the first metal oxide layer's surface was minutely rough and had numerous micro-pits.

It is understood that the test results of Examples 1–3 are better than those of Comparative Example 1 as shown in Table 1. Therefore, although the first metal oxide layer's surface of Comparative Example 1 was minutely rough as well as those of Examples 1–3, it is considered that the first metal oxide layer of Comparative Example 1 is materially different from those of Examples 1–3. In other words, it is considered that the surface roughness of the first metal oxide layer of Comparative Example 1 is different from those of Examples 1–3, which leads to the difference of the test results.

COMPARATIVE EXAMPLE 2

In this comparative example, Example 1 was repeated except that the second and third sols of Example 1 were omitted in the preparation of the first metal oxide layer. In fact, a first sol was prepared by mixing 16 g of tetraethoxysilane, 16 g of ethanol and 5.5 g of-water of which pH value had been adjusted to 4 and by refluxing this mixture at about 80° C. for about 4 hr. This first sol itself was used as the first coating solution for forming the first metal oxide layer.

Figure 7:
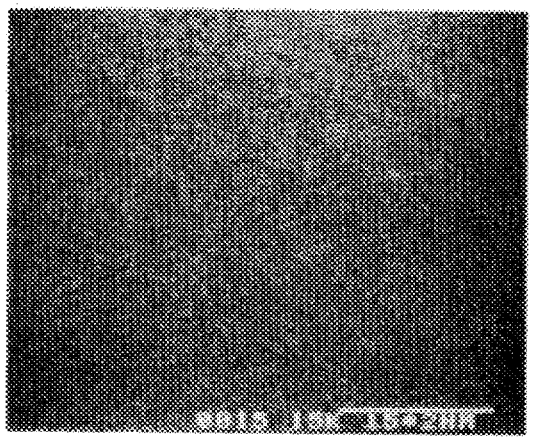

As is shown in FIG. 7, it was found by the observation with SEM that the first metal oxide layer's surface was flat.

COMPARATIVE EXAMPLE 3

In this comparative example, Comparative Example 2 was repeated except that the first metal oxide layer was etched with an about 0.1 wt % HF aqueous solution at a temperature of about 25° C. before the formation of the second water-repellent layer on the first layer.

Figure 8:
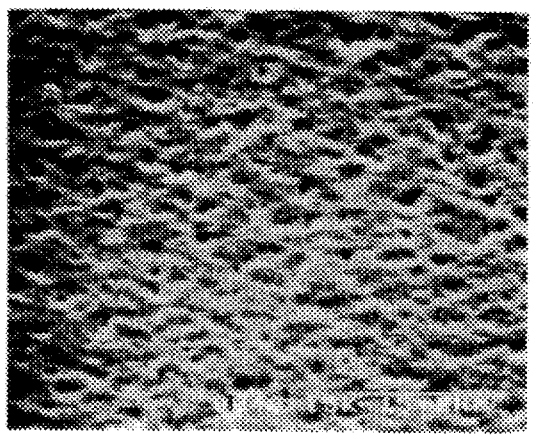

As is shown in FIG. 8, it was found by the observation with SEM that the first metal oxide layer's surface was minutely rough.

It is understood that the test results of Examples 1–3 are better than those of Comparative Example 3 as shown in Table 1. Therefore, although the first metal oxide layer's surface of Comparative Example 3 was minutely rough, it is considered that the first metal oxide layer of Comparative Example 3 is materially different from those of Examples 1–3. In other words, it is considered that the configuration of the first metal oxide layer's surface of Comparative Example 3 is different from those of Examples 1–3, which leads to the difference of the test results (see FIGS. 1 and 2).

TABLE 1

| | Initial Contact Angle (°) | Contact Angle After Durability Test (°) | Existence of Scratches After Durability Test | Contact Angle After Weatherability Test (°) |
| --- | --- | --- | --- | --- |
| Ex. 1 | 112 | 105 | No | 90 |
| Ex. 2 | 111 | 104 | No | 92 |
| Ex. 3 | 109 | 102 | No | 85 |
| Com. Ex. 1 | 113 | 90 | Yes | 70 |
| Com. Ex. 2 | 108 | 70 | Yes | 50 |
| Com. Ex. 3 | 112 | 80 | Yes | 70 |

According to the second aspect of the present invention, the multilayered water-repellent film has a first layer which may be a conventional metal oxide layer having a minutely rough surface having on the surface micro-pits and/or micro-projections and an improved second water-repellent layer which is in accordance with the present invention. This combination of the first and second layers provides the multilayered film with superior durability of water repellency, mechanical strength and chemical resistance. However, it is optional in the present invention to combine the first metal oxide layer according to the first aspect of the present invention with the second water-repellent layer according to the second aspect of the present invention.

The features of the second aspect of the present invention will be described in the following.

The first metal oxide layer according to the second aspect of the present invention is not particularly limited to a specific one as long as it has a minutely rough surface having micro-pits and/or micro-projections (see FIG. 1). For example, the first metal oxide layer may be a conventional metal oxide layer which is disclosed in JP-A-6-16455. That is, the first metal oxide layer according to the second aspect of the present invention may be prepared by a method comprising the steps of: (a) preparing at least two sols respectively from at least one compound so as to disperse at least two polymers of the at least one compound in the at least two sols, the at least one compound being selected from the group consisting of metal alkoxides and metal acetylacetonates, the at least two polymers having different average molecular weights; (b) mixing the at least two sols together with a solvent so as to prepare a first coating mixture; (c) applying the first coating mixture to a glass substrate so as to form thereon a first sol film; and (d) heating the first sol film at a temperature not lower than 100° C. so as to transform the first sol film into a first gel film and then into the first metal oxide layer which has a minutely rough surface having numerous micro-pits and/or micro-projections.

The second layer according to the second aspect of the present invention is prepared by a method comprising the steps of: (a) preparing a second coating mixture by mixing together a fluoroalkylsilane, tin oxide particles doped with antimony oxide, a silicon compound, water and an organic solvent; (b) applying the second coating mixture to the first metal oxide layer so as to form a second film on the first layer; and (c) heating the second film at a temperature ranging from 100° to 300 C.

Water is contained in the second coating mixture for partially hydrolyzing the fluoroalkylsilane. This water may be added in the form of pure water, a nitric acid aqueous solution and/or an impurity contained in the silicon compound (a silica sol).

It is preferable that one polymer of the above at least two polymers for the preparation of the first layer has an average molecular weight ranging from about 800 the bout 10,000 and the other at least one polymer of the above at least two polymers has an average molecular weight not lower than 10,000.

The above metal alkoxide for the preparation of the first layer may be either a simple alkoxide having no organic group other than alkoxyl group, such as a methoxide, an ethoxide, an isopropoxide or the like, or an alkyl alkoxide having at least one alkyl group besides alkoxyl group, such as a monomethylalkoxide or a monoethyl-alkoxide. The above metal acetylacetonate for the preparation of the first layer may be either a simple acetylacetonate having no organic group other than acetylacetone group, or an acetylalkoxyacetonate such as methylalkoxyacetonate or ethylalkoxyacetonate.

It is preferable to use Si, Ti and/or Zr as a metal of metal alkoxide or of the metal acetylacetonate. Thus, examples of the metal alkoxides and the metal acetylacetonates are tetramethoxysilane, tetraethoxysilane, methyltriethoxysilane, methyltrimethoxysilane, titanium tetraisopropoxide, titanium acetylacetonate, zirconium n-butoxide, zirconium acetylacetonate, dimethyldiethoxysilane, dimethyldimethoxysilane, titanium tetra-n-butoxide, zirconium tetraisopropoxide and zirconium tetraoctyrate.

The average diameter of the micro-pits and/or micro-projections formed on the first metal oxide layer can be controlled within a preferable range of from 5 to 500 nm, for example, by controlling relative humidity of the atmosphere where the first metal oxide layer is formed on a glass substrate. If it exceeds 500 nm, the first metal oxide layer becomes white in color and inferior in mechanical strength. If it is less than 5 nm, it becomes difficult to hold tin oxide particles doped with antimony oxide on the first layer.

It is preferable that the first metal oxide layer has a thickness ranging from 10 to 300 nm. A more preferable range is from 30 to 200 nm. If it is greater than 300 nm, the first layer becomes insufficient in strength. If it is less than 10 nm, micro-pits and/or micro-projections are hardly formed on the first layer. It is preferable that the first sol film is heated at a temperature ranging from about 100° to about 400° C. for a period ranging from about 5 to about 15 min so as to form the first gel film. Furthermore, it is preferable that the first gel film is heated at a temperature ranging from about 550° to 650° C. for a period ranging from about 1 to about 10 min.

It is preferable that the average particle size of the tin oxide particles doped with antimony oxide for the second layer is not larger than 100 nm. If it exceeds 100 nm, it becomes difficult to hold the tin oxide particles on the first metal oxide layer.

Examples of the fluoroalkylsilane for the preparation of the second layer are $CF_3CH_2CH_2Si(OCH_3)_3$, $CF_3CH_2CH_2SiCl_3$, $CF_3(CF_2)_5CH_2CH_2Si(OCH_3)_3$, $CF_3(CF_2)_5CH_2CH_2Si(OCH_3)Cl_3$, $CF_3(CF_2)_7CH_2CH_2Si(OCH_3)_3$, $CF_3(CF_2)_7CH_2CH_2SiCl_3$, $CF_3(CF_2)_7CH_2CH_2SiCH_3(OCH_3)_2$, $CF_3(CF_2)_7CH_2CH_2SiCH_3Cl_2$.

According to the second aspect of the present invention, tin oxide for the preparation of the second layer is doped with antimony oxide. With this, impurity HOMO (Highest Occupied Molecular Orbital) level of antimony oxide is formed in the band energy gap between HOMO and LUMO (Lowest Unoccupied Molecular Orbital) of tin oxide. This doping provides tin oxide with semi-conducting property. This doped tin oxide is used for suppressing the light deterioration of fluoroalkylsilane. Tin oxide has the same crystal structure as that of cassiterite. It is considered that antimony oxide exists in the crystal structure of tin oxide as a penetration-type solid solution. By the existence of antimony oxide in the crystal structure of tin oxide, tin oxide is partially reduced and excess elections are supplied to LUMO level of tin oxide. This provides the doped tin oxide with electron conductivity. The doped tin oxide has the formula of $SnO_{2-x}·Sb_2O_{3+x}$. Examples of commercial products of tin oxide fine particles doped with antimony oxide are T-1 which is a trade name of Mitsubishi Material Co., and ELCOM which is a trade name of Catalyst And Chemicals Industry Co. An example of commercial products of a sol containing a silicon compound and tin oxide particles doped with antimony oxide is ELCOM CT which is a trade name of Catalyst And Chemicals Industry Co.

Preferable examples of the silicon compound for the preparation of the second layer are hydrolysates of tetramethoxysilane, tetraethoxysilane, methyltriethoxysilane and methyltrimethoxysilane.

Examples of the organic solvent for the second layer are alcohols such as methanol, ethanol, propanol and butanol, esters such as methyl acetate ester and ethyl acetate ester, ethers such as diethyl ether, ketones such as acetone and methylethylketone, ethyl cellosolve and a mixture of at least two of these compounds.

It is preferable that the second coating mixture contains 0.10–20 wt % of fluoroalkylsilane. If it is less than 0.10 wt %, water-repellency of the second layer tends to become insufficient. If it is greater than 20 wt %, the weight ratio of fluoroalkylsilane to the doped tin oxide becomes too high. With this, the advantage of the addition of the doped tin oxide becomes less.

It is preferable that the second coating mixture contains 0.10–2 wt % of the doped tin oxide particles so as to improve durability of water repellency of the second layer. If it is less than 0.10 wt %, this improvement becomes less. If it is greater than 2 wt %, the desired water repellency can not be obtained.

It is preferable that the second coating mixture contains 0.10–2 wt % of the silicon compound so as to stably hold the doped tin oxide fine particles on the first layer. If it is less than 0.10 wt %, the effect of the silicon compound addition becomes insufficient. If it is greater than 2 wt %, the desired water repellency can not be obtained.

It is preferable that the second film is heated at a temperature ranging from 100° to 300° C. If it is lower than 100° C. or higher than 300° C., durability of water repellency of the second layer does not improve.

As the coating method of the second coating mixture it is usual to use dip coating, spraying, flow coating or spin coating.

The following nonlimitative Examples 4 to 15 are in accordance with the second aspect of the present invention, and the following Comparative Examples 4 to 14 are not in accordance with the second aspect of the present invention.

EXAMPLE 4

A multilayered water-repellent film was formed on a glass substrate in accordance with the following steps.

Firstly, the glass substrate was cleaned in the same manner as that of Example 1. Then, a conventional first metal oxide layer was formed on the glass substrate in accordance with the following steps.

This conventional first layer was prepared by using a mixture of two sols of which polymers have different average molecular weights. That is, about 20.0 g of a first silica sol having an average molecular weight of about 3,000 and containing about 30 wt % of solid matter was mixed with about 28.6 g of a second silica sol having an average molecular weight of about 100,000 and containing about 6 wt % of solid matter in a beaker such that the molar ratio of the solid matter of the first sol to that of the second sol was adjusted to about 3.5:1. Then, the mixture was diluted with about 50 g of isopropyl alcohol and about 100 g of 1-butanol. This mixture was stirred for about 15 hr so as to prepare a first coating mixture. The first coating mixture was applied to the glass substrate by dip coating in an atmosphere of a temperature of about 23° C. and a relative humidity of about 50%. Then, the thus coated glass substrate was heated at a temperature of about 270° C. for about 10 min so as to form a first gel film having a thickness of about 150 nm on the glass substrate. Then, the coated glass substrate was heated at a temperature of about 600° C. for about 3 min such that a first metal oxide film having a thickness of about 100 nm and a minutely rough surface having numerous micro-pits having an average diameter of about 50 nm was formed.

Then, a second water-repellent layer was formed on the first layer in accordance with the following steps. At first, a second coating mixture was prepared by mixing together about 0.99 g of a silica sol (solvent: ethanol) as the silicon compound, about 0.01 g of T-1 which is a trade name of Mitsubishi Material Co. as the tin oxide fine particles (particle size: about 20 nm) doped with antimony oxide about 5 g of isopropyl alcohol and about 1 g of heptadecatridecyl-fluoroalkylsilane as the fluoroalkylsilane. Hereinafter, heptadecatridecylfluoroalkylsilane will be referred to as the fluoroalkylsilane. The silica sol had an average molecular weight of about 3,000 and contained 1 wt % of solid matter. The second coating mixture contained about 0.14 wt % of the silicon compound, about 0.14 wt % of the doped tin oxide and about 14.29 wt % of the fluoroalkylsilane. Then, the second coating mixture was applied to the first layer in the same atmosphere as that of the application of the first coating mixture so as to form a second layer on the first layer. Then, the thus coated glass substrate was heated at a temperature of about 250° C. for about 30 min so as to form a second water-repellent layer on the first metal oxide layer.

To evaluate water repellency of the film, the contact angle of water drop on the film was measured by a contact angle meter in an atmosphere of a temperature of about 25° C.

Durability of the multilayered film was evaluated by an durability test using a practical wiper blade for an automobile window. Under a load of about 105 g/cm, the wiper blade was kept in contact with the film on the glass substrate and moved reciprocatively until it made about 100,000 successive rubbing passes. One reciprocation was counted as one pass. Tap water was dropped to the film during this test. The degree of durability of the film was valued by the amount of a change in the contact angle of water drop from the contact angle before this test. The results are shown in Table 2.

Weatherability of the multilayered film was evaluated by a super UV accelerated weatherability test. In this test, the film was exposed to light rays of about 60 mW/cm$^2$ for about 2,000 hr. The degree of weatherability of the film was valued by the amount of a change in the contact angle of water drop from the contact angle before the weatherability test. The result is shown in Table 2.

Each of the glass substrates having thereon the multilayered water-repellent films in accordance with the following Examples 5–15 and Comparative Examples 4–13 was also subjected to the same tests of Example 4. The results are shown in Table 2.

EXAMPLE 5

In this example, Example 4 was repeated except that the amounts of the first and second silica sols for the preparation of the first layer were changed. In fact, about 30 g of the first silica sol of Example 4 was mixed with about 23.1 g of the second silica sol of Example 4 such that the molar ratio of the solid matter of the first silica sol to that of the second silica sol was about 6.5:1.

The formed first metal oxide layer had a thickness of about 50 nm and a minutely rough surface having micro-pits and micro-projections. The distance between adjacent two micro-projections was about 400 nm. The average diameter of the micro-pits and micro-projections was about 400 nm.

EXAMPLE 6

In this example, Example 4 was repeated except that the amounts of the first and second silica sols for the preparation of the first layer were changed. In fact, about 40 g of the first silica sol of Example 4 was mixed with about 18.2 g of the second silica sol of Example 4 such that the molar ratio of the solid matter of the first silica sol to that of the second silica sol was about 11:1.

The formed first metal oxide layer had a thickness of about 60 nm and a minutely rough surface having micro-projections. The distance between adjacent two micro-projections was in a range of from about 300 to 500 nm. The average diameter of the micro-projections was in a range of from 300 to 500 nm.

EXAMPLE 7

In this example, Example 4 was repeated except that the relative humidity of the atmosphere was changed from about 50% to about 35%.

The formed first metal oxide layer had a thickness of about 100 nm and a minutely rough surface having thereon micro-pits. The average diameter of the micro-pits was in the range of from about 10 to about 20 nm.

EXAMPLE 8

In this example, Example 5 was repeated except that the composition of the second coating mixture was changed. In fact, a second coating mixture was prepared by mixing together about 17.2 g of the silica sol of Example 4, about 0.4 g of T-1 (the doped tin oxide) of Example 4, about 5 g of isopropyl alcohol and about 1 g of the fluoroalkylsilane. The second coating mixture contained about 0.73 wt % of the silicon compound, about 1.69 wt % of the doped tin oxide and about 4.24 wt % of the fluoroalkylsilane.

The formed first metal oxide layer of Example 8 had a thickness of about 50 nm and its surface roughness was substantially similar to that of Example 5. Furthermore, each of the first metal oxide layers according to the following Examples 9–15 and Comparative Examples 5–13 also had a thickness of about 50 nm and its surface roughness was substantially similar to that of Example 5. In other words, according to Examples 8–15 and Comparative Examples 5–13, each of the first metal oxide layers had a minutely rough surface having thereon micro-pits and micro-projections; the distance between adjacent two micro-projections was about 400 nm; and the average diameter of the micro-pits and micro-projections was about 400 nm.

EXAMPLE 9

In this example, Example 5 was repeated except that the coated second film was heated at a temperature of about 140° C. for 30 min.

EXAMPLE 10

In this example, Example 5 was repeated except that the composition of the second coating mixture was changed. In fact, a second coating mixture was prepared by mixing together about 4 g of a silica sol (solvent: ethanol), about 0.17 g of T-1 (the doped tin oxide particles) of Example 5, about 18.5 g of isopropyl alcohol and about 1 g of the fluoroalkylsilane. This silica sol had an average molecular weight of about 3,000 and contained 10 wt % of solid matter. The second coating mixture contained about 1.69 wt % of the silicon compound, about 0.73 wt % of the doped tin oxide and about 4.24 wt % of the fluoroalkylsilane.

EXAMPLE 11

In this example, Example 5 was repeated except that the composition of the second coating mixture was changed. In fact, a second coating mixture was prepared by mixing together about 0.1 g of the silica sol of Example 10, about 0.01 g of T-1 (the doped tin oxide particles), about 4.4 g of isopropyl alcohol and about 1.13 g of the fluoroalkylsilane. The second coating mixture contained about 0.18 wt % of the silicon compound, about 0.18 wt % of the doped tin oxide and about 20.00 wt % of the fluoroalkylsilane.

EXAMPLE 12

In this example, Example 5 was repeated except that the composition of the second coating mixture was changed and that the coated second layer was heated at a temperature of about 300° C. for about 30 min.

In fact, a second coating mixture was prepared by mixing together about 4 g of the silica sol of Example 10, about 0.17 g of T-1 (the doped tin oxide particles), about 18.5 g of isopropyl alcohol and about 0.02 g of the fluoroalkylsilane. The second coating mixture contained about 1.76 wt % of the silicon compound, about 0.75 wt % of the doped tin oxide and about 0.10 wt % of the fluoroalkylsilane.

EXAMPLE 13

In this example, Example 5 was repeated except that the composition of the second coating mixture was changed.

In fact, a second coating mixture was prepared by mixing together about 17.2 g of the silica sol of Example 4, about 0.47 g of T-1 (the doped tin oxide particles), about 5 g of isopropyl alcohol and about 1 g of the fluoroalkylsilane. The second coating mixture contained about 0.73 wt % of the silicon compound, about 2.00 wt % of the doped tin oxide and about 4.22 wt % of the fluoroalkylsilane.

EXAMPLE 14

In this example, Example 5 was repeated except that the composition of the second coating mixture was changed and that the coated second film was heated at a temperature of about 100° C. for about 30 min.

In fact, a second coating mixture was prepared by mixing together about 4.92 g of the silica sol of Example 10, about 0.17 g of T-1 (the doped tin oxide particles), about 18.5 g of isopropyl alcohol and about 1 g of the fluoroalkylsilane. The second coating mixture contained about 2.00 wt % of the silicon compound, about 0.69 wt % of the doped tin oxide and about 4.07 wt % of the fluoroalkylsilane.

EXAMPLE 15

In this example, Example 5 was repeated except that the composition of the second coating mixture was changed.

In fact, a second coating mixture was prepared by mixing together about 6.27 g of a sol made by Catalyst And Chemicals Industry Co., about 5 g of isopropyl alcohol and about 1 g fluoroalkyl-silane. This sol contained the silicon compound and the doped tin oxide particles (particle size: about 5 nm). This sol contained 2.5 wt % of solid matter. The second coating mixture contained about 0.57 wt % of the silicon compound, about 0.73 wt % of the doped tin oxide and about 8.15 wt % of the fluoroalkylsilane.

COMPARATIVE EXAMPLE 4

In this comparative example, Example 4 was repeated except that the first silica sol was omitted and that only about 200 g of the second silica sol of Example 4 was used as the first coating mixture for the preparation of the first layer.

The formed first metal oxide layer had a thickness of about 150 nm. Although the first layer's surface had thereon micro-pits having an average diameter of about 2 nm, the first layer's surface was relatively flat.

COMPARATIVE EXAMPLE 5

In this comparative example, Example 5 was repeated except that the composition of the second coating mixture was changed. In fact, the essential tin oxide particles doped with antimony oxide were omitted in this comparative example. The second coating mixture was prepared by mixing together about 1 g of the silica sol of Example 4, about 5 g of isopropyl alcohol and about 1 g of the fluoroalkylsilane. The second coating mixture contained about 0.14 wt % of the silicon compound and about 14.29 wt % of the fluoroalkylsilane.

The formed first metal oxide layer had a thickness of about 50 nm. Similarly, each first metal oxide layer according to the aftermentioned Comparative Example 6–13 also had a thickness of about 50 nm.

COMPARATIVE EXAMPLE 6

In this comparative example, Example 5 was repeated except that the composition of the second coating mixture was changed. In fact, the silicon compound content of the second coating mixture was higher than the preferable range (0.1–2 wt %) of the present invention. The second coating mixture was prepared by mixing together about 4.0 g of the silica sol of Example 10, about 0.01 g of T-1 (the tin oxide particles doped with antimony oxide), about 3 g of isopropyl alcohol and about 1 g of the fluoroalkylsilane. The second coating mixture contained about 5.00 wt % of the silicon compound, about 0.12 wt % of the doped tin oxide and about 12.48 wt % of the fluoroalkylsilane.

COMPARATIVE EXAMPLE 7

In this comparative example, Example 5 was repeated except that the composition of the second coating mixture was changed. In fact, the doped tin oxide content of the second coating mixture was higher than the preferable range (0.1–2 wt %) of the present invention. The second coating mixture was prepared by mixing together about 0.99 g of the silica sol of Example 4, about 0.37 g of T-1 (the tin oxide particles doped with antimony oxide), about 5 g of isopropyl alcohol and about 1 g of the fluoroalkylsilane. The second coating mixture contained about 0.14 wt % of the silicon compound, about 5.00 wt % of the doped tin oxide and about 14.29 wt % of the fluoroalkylsilane.

COMPARATIVE EXAMPLE 8

In this comparative example, Example 5 was repeated except that the composition of the second coating mixture was changed. In fact, the fluoroalkylsilane content of the second coating mixture was lower than the preferable range (0.10–20 wt %) of the present invention. The second coating mixture was prepared by mixing together about 0.99 g of the silica sol of Example 4, about 0.01 g of T-1 (the tin oxide particles doped with antimony oxide), about 5 g of isopropyl alcohol and about 0.003 g of the fluoroalkylsilane. The second coating mixture contained about 0.14 wt % of the silicon compound, about 0.14 wt % of the doped tin oxide and about 0.05 wt % of the fluoroalkylsilane.

COMPARATIVE EXAMPLE 9

In this comparative example, Example 5 was repeated except that the second layer was heated at a temperature of about 60° C. for 30 min. That is, the heating temperature of the second layer was lower than the preferable range (100°–300° C.) of the present invention.

COMPARATIVE EXAMPLE 10

In this comparative example, Example 5 was repeated except that the second layer was heated at a temperature of about 350° C. for 30 min. That is, the heating temperature of the second layer was higher than the preferable range (100°–300° C.) of the present invention.

COMPARATIVE EXAMPLE 11

In this comparative example, Example 5 was repeated except that the composition of the second coating mixture was changed. In fact, the doped tin oxide content of the second coating mixture was lower than the preferable range (0.10–2 wt %) of the present invention. The second coating mixture was prepared by mixing together about 1 g of the silica sol of Example 4, about 0.0035 g of T-1 (the tin oxide particles doped with antimony oxide), about 5 g of isopropyl alcohol and about 1 g of the fluoroalkylsilane. The second coating mixture contained about 0.14 wt % of the silicon compound, about 0.05 wt % of the doped tin oxide and about 14.28 wt % of the fluoroalkylsilane.

COMPARATIVE EXAMPLE 12

In this comparative example, Example 5 was repeated except that the composition of the second coating mixture was changed. In fact, the fluoroalkylsilane content of the second coating mixture was higher than the preferable range. (0.10–20 wt %) of the present invention. The second coating mixture was prepared by mixing together about 1 g of the silica sol of Example 4, about 0.01 g of T-1 (the tin oxide particles doped with antimony oxide), about 4 g of isopropyl alcohol and about 2.15 g of the fluoroalkylsilane. The second coating mixture contained about 0.14 wt % of the silicon compound, about 0.14 wt % of the doped tin oxide and about 30.00 wt % of the fluoroalkylsilane.

COMPARATIVE EXAMPLE 13

In this comparative example, Example 5 was repeated except that the composition of the second coating mixture was changed. In fact, the silicon compound content of the second coating mixture was lower than the preferable range (0.10–2 wt %) of the present invention. The second coating mixture was prepared by mixing together about 0.32 g of the silica sol of Example 4, about 0.01 g of T-1 (the tin oxide particles doped with antimony oxide), about 5 g of isopropyl alcohol and about 1 g of the fluoroalkylsilane. The second coating mixture contained about 0.05 wt % of the silicon compound, about 0.16 wt % of the doped tin oxide and about 15.80 wt % of the fluoroalkylsilane.

COMPARATIVE EXAMPLE 14

In this comparative example, the first metal oxide layer was formed on the glass substrate in accordance with Example 5 except that the relative humidity of the atmosphere where the first coating mixture is applied to the glass substrate was changed to 70%.

The formed first metal oxide layer had a minutely rough surface having thereon micro-pits and micro-projections. The distance between adjacent two micro-projections was about 600 nm. The average diameter of the micro-pits and micro-projections was about 600 nm. However, this first layer became opaque in color. Therefore, the formation of the second layer was omitted. In contrast, the first layers according to Examples 1–15 and Comparative Examples 1–13 were transparent. Thus, the evaluation tests of Example 4 were not conducted on the first metal oxide layer of Comparative Example 14.

TABLE 2

|  | Initial Contact Angle (°) | Contact Angle After Weatherability Test (°) | Contact Angle After Durability Test (°) |
|---|---|---|---|
| Example 4 | 113 | 100 | 100 |
| Example 5 | 113 | 100 | 100 |
| Example 6 | 113 | 100 | 100 |
| Example 7 | 113 | 100 | 100 |
| Example 8 | 111 | 97 | 100 |
| Example 9 | 113 | 100 | 100 |
| Example 10 | 111 | 95 | 100 |
| Example 11 | 114 | 100 | 100 |
| Example 12 | 114 | 100 | 100 |
| Example 13 | 111 | 98 | 100 |
| Example 14 | 110 | 95 | 100 |
| Example 15 | 110 | 95 | 100 |
| Com. Example 4 | 110 | 50 | 70 |
| Com. Example 5 | 113 | 60 | 100 |
| Com. Example 6 | 94 | 60 | 80 |
| Com. Example 7 | 97 | 76 | 80 |
| Com. Example 8 | 75 | 46 | 60 |
| Com. Example 9 | 112 | 44 | 70 |
| Com. Example 10 | 108 | 45 | 70 |
| Com. Example 11 | 113 | 65 | 100 |
| Com. Example 12 | 113 | 70 | 100 |
| Com. Example 13 | 113 | 70 | 100 |

According to the third aspect of the present invention, the multilayered water-repellent film has a first layer which may be a conventional metal oxide layer having a minutely rough surface having on the surface micro-pits and/or micro-projections and an improved second water-repellent layer which is in accordance with the present invention. This combination of the first and second layers provides the multilayered film with superior durability of water repellency, mechanical strength and chemical resistance. However, as is described in the aftermentioned Examples 21–22, it is optional in the present invention to combine the first metal oxide layer according to the first aspect of the present invention with the second water-repellent layer according to the third aspect of the present invention.

The features of the third aspect of the present invention will be described in the following.

As is the same as the second aspect of the present invention, the first metal oxide layer according to the third aspect of the present invention is not particularly limited to a specific one as long as it has a minutely rough surface having on the surface micro-pits and/or micro-projections. For example, the first metal oxide layer may be a conventional metal oxide layer which is disclosed in JP-A-6-16455. This conventional first metal oxide layer is explained in the above description of the second aspect of the present invention. Furthermore, as is mentioned hereinabove, the above first metal oxide layer of the first aspect of the present invention may be used as the first layer according to the third aspect of the present invention. Examples of the first metal oxide layer's composition are $SiO_2$, a mixture of $SiO_2$ and $TiO_2$ and a mixture of $SiO_2$ and $ZrO_2$.

It is preferable that the average diameter of the micro-pits and/or micro-projections formed on the first metal oxide layer according to the third aspect of the present invention is in the range of from 5 to 500 nm because of the same reasons described in the second aspect of the present invention.

It is preferable that the first metal oxide layer according to the third aspect of the present invention has a thickness ranging from 10 to 300 nm because of the same reasons described in the second aspect of the present invention. It is preferable that the first sol film is heated at a temperature ranging from about 100° to about 400° C. for a period ranging from about 5 to about 15 min so as to form the first gel film. Furthermore, it is preferable that the first gel film is heated at a temperature ranging from about 550° to 650° C. for a period ranging from about 1 to about 10 min.

According to the present invention, the first metal oxide layer has a minutely rough surface having on the surface micro-pits and/or micro-projections. A preferable surface roughness of the first metal oxide layer according to the first, second and third aspects of the present invention will be discussed in the following. The surface roughness is defined in terms of several parameters. These parameters are maximum height (Ry), arithmetical men roughness (Ra), ten-point mean roughness (Rz), mean spacing of profile irregularities (Sin) and the like which are described in Japanese Industrial Standard (JIS) B 0601-1994 corresponding to ISO 468-1982, ISO 3274-1975, ISO 4287/1-1984, ISO 4287/2-1984 and ISO 4288-1985. The surface roughness of an object is expressed by each arithmetical mean value of Ry, Ra, Rz, Sm and the like which are the parameters expressing the surface roughness at each part sampled randomly from the surface of an object (hereinafter referred to as "objective surface").

Figure 9:
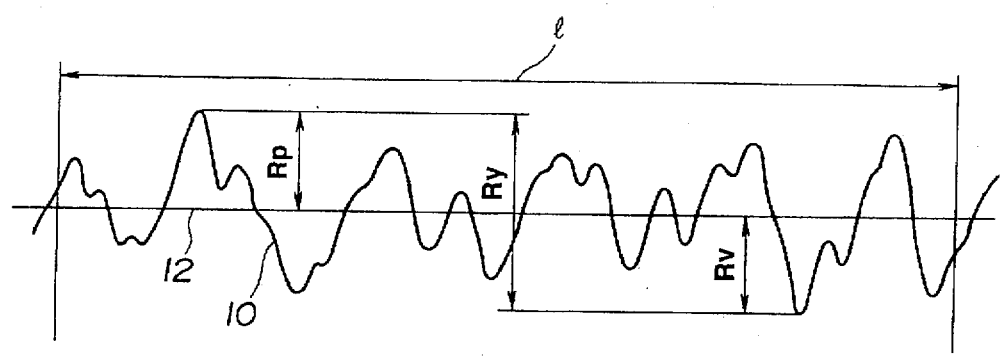
FIGS. 9–12 are sectional views each showing a schematic surface contour of a section of an object, the section being perpendicular to the object's surface.

With reference to FIG. 9, determination of Ry will be described in the following. A schematic roughness curve 10 is a contour of a section which is perpendicular to the surface of an object. In other words, the surface roughness of an object is schematically shown by the roughness curve 10. Designated by numeral 12 is a mean (center) line of the roughness curve 10. To determine Ry, only a reference (standard) length l is sampled from the roughness curve 10 in the direction of the mean line 12. Ry is the sum of Rp and Rv. Rp is defined as the distance between the mean line 12 and the top of the highest micro-projection on this sampled portion. Rv is the distance between the mean line 12 and the bottom of the deepest micro-pit (profile valley).

One micro-projection (profile peak) is defined as an outwardly directed entity of profile surrounded by the roughness curve 10 and the mean line 12 connecting two adjacent points of the intersection made when cutting the roughness curve 10 with the mean line 12 (see FIG. 9). One micro-pit is defined as an inwardly directed portion of space surrounded by the roughness curve 10 and the mean line 12 connecting two adjacent points of intersection made when cutting the roughness curve 10 with the mean line 12 (see FIG. 9).

Figure 10:
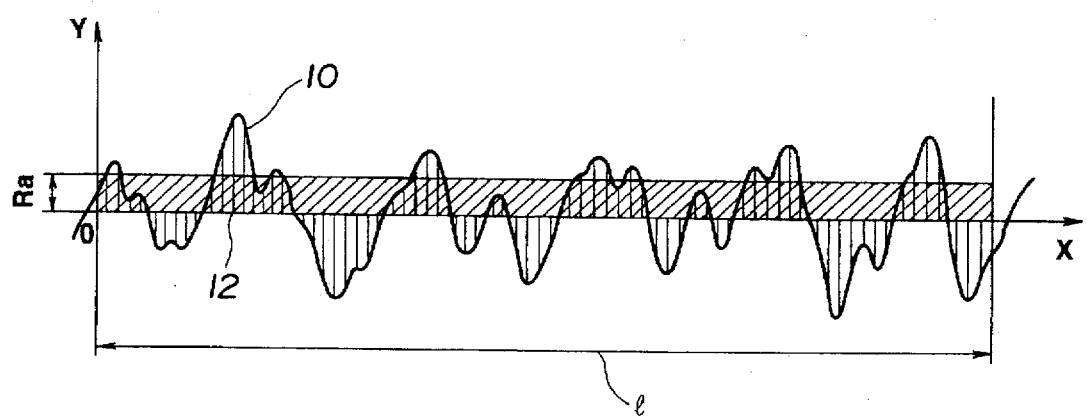

With reference to FIG. 10, determination of Ra is described in the following. Ra means the value obtained by the following formula when sampling only the reference length l from the roughness curve 10 in the direction of the mean line 12, taking X-axis in the direction of the mean line 12 and Y-axis in the direction of longitudinal magnification of this sampled part and the roughness curve 10 is expressed by y=f(x):

$$Ra = \frac{1}{l} \int_0^l |f(x)| dx$$

where l is the reference length.

Figure 11:
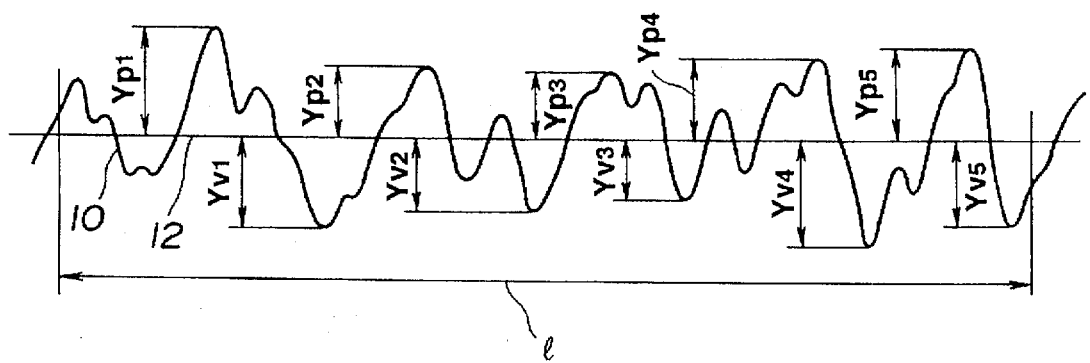

With reference to FIG. 11, determination of Rz is described in the following. To determine Rz, only the reference length l is sampled from the roughness curve 10 in the direction of the mean line 12. As is shown in the following formula, Rz is defined as the sum of the average value of absolute values of the heights of five highest micro-projections (Yp) and the depths of five deepest micro-pits (Yv) measured in the vertical magnification direction from the mean line 12 of this sampled portion:

$$Rz = \frac{|Yp1 + Yp2 + Yp3 + Yp4 + Yp5| + |Yv1 + Yv2 + Yv3 + Yv4 + Yv5|}{5}$$

where Yp1, Yp2, Yp3, Yp4 and Yp5 are altitudes of the heights of five highest micro-projections of the sampled portion corresponding to the reference length l and Yv1, Yv2, Yv3, Yv4 and Yv5 are altitudes of the depths of five deepest micro-pits of the sampled portion corresponding to the reference length l.

Figure 12:
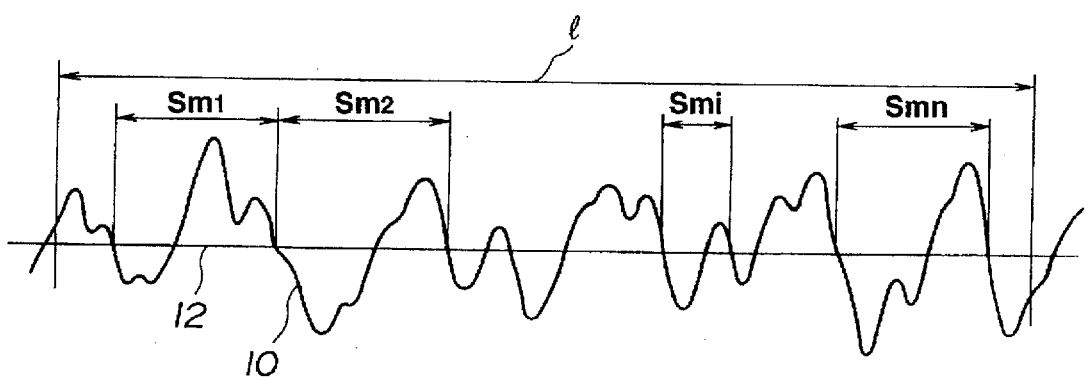

With reference to FIG. 12, determination of Sm is described in the following. To determine Sm, the portion equal to the reference length l is sampled from the roughness curve 10 in the direction of the mean line 12. Within this sampled portion, the sum of the lengths of mean lines 12 corresponding to one of the micro-projections and one micro-pit adjacent to it (hereinafter referred to as "spacing of profile irregularities") is obtained. As is shown in the following formula, Sm is defined as the arithmetical mean value of many spacings of these irregularities:

$$Sm = \frac{1}{n} \sum_{i=1}^{n} Smi$$

where Smi is a spacing of irregularities, and "n" is number of spacings of irregularity lying within the reference length l.

It is preferable that the first metal oxide layer's surface according to the present invention has a value of Ry ranging from 5 to 60 nm, a value of Ra ranging from 2 to 20 nm, a value of Rz ranging from 5 to 55 nm and a value of Sm ranging from 5 to 700 nm. The values of these parameters can determined with the observation of the first layer's surface, for example, with a scanning probe microscope (for example, SP3700 type of SEIKO INSTRUMENTS INC. or NV200 type of OLYMPUS OPTICS CO.) using its mode of atomic force microscope (AFM). In case that Ry is greater than 60 nm, that Ra is greater than 20 nm and that Rz is greater than 55 nm, the micro-pits and or micro-projections on the first layer tend to be destroyed by an external force such as abrasion. With this, the multilayered film becomes inferior in durability. In case that Ry is less than 5 nm, that Ra is less than 2 nm and that Rz is less than 5 nm, the first layer's surface becomes almost flat.

Furthermore, it is preferable that the first metal oxide layer's surface according to the present invention has a value of skewness (Rsk) not smaller than 0. The value of Rsk is defined by the following formula:

$$Rsk = \int \{f(x) - f_a(x)\}^3 dx / (RMS)^3 l$$

where f(x) represents the roughness curve 10, $f_a(x)$ represents the mean line 12, RMS represents a so-called standard deviation of the surface roughness, and l is the reference length (see FIG. 9). RMS is defined by the following formula:

$$RMS = [\int \{f(x) - f_a(x)\}^2 dx / l]^{1/2}$$

where f(x) represents the roughness curve 10, $f_a(x)$ represents the mean line 12 and l is the reference length (see FIG. 9). Rsk is a parameter which statistically shows if the surface has many micro-projections which are sharp in shape, over the mean line 12, or if the surface has many deep valleys. In the former case, Rsk is greater than 0. In the latter case, Rsk is smaller than 0. With this, the second Water-repellent layer is not sufficiently held on the first layer. Thus, the second layer becomes inferior in durability. In the present application, the above-mentioned term of the deep valley is used as being different from the micro-pit in shape. The shape of the deep valley is similar to that of a hole made by the etching with hydrofluoric acid on a flat surface. If the surface has no sharp micro-projection nor deep valley and the surface roughness is symmetrical about the mean line 12, Rsk is 0. It is more preferable that the value of Rsk is 0 or a value which is greater than and close to 0. With this, the first layer's surface has numerous conical micro-projections which are not too sharp in shape (see FIG. 1).

Still furthermore, it is preferable that the first metal oxide layer's surface according to the present invention has a value of kurtosis (Rkr) not less than 3. The value of Rkr is defined by the following formula:

$$Rkr = \int \{f(x) - f_a(x)\}^4 dx / (RMS)^4 l$$

where f(x) represents the roughness curve 10, $f_a(x)$ represents the mean line 12, RMS represents the standard deviation of the surface roughness as defined above, and l is the reference length (see FIG. 9). If the value of Rkr is smaller than 3, contact area between the first and second layers becomes too small. Thus, the multilayered film becomes inferior in durability of water repellency. It is more preferable that the value of Rkr is 3 or a value which is greater than and close to 3. With this, the first layer's surface has numerous micro-projections which are desirably sharp in shape (see FIG. 1).

Figure 2:
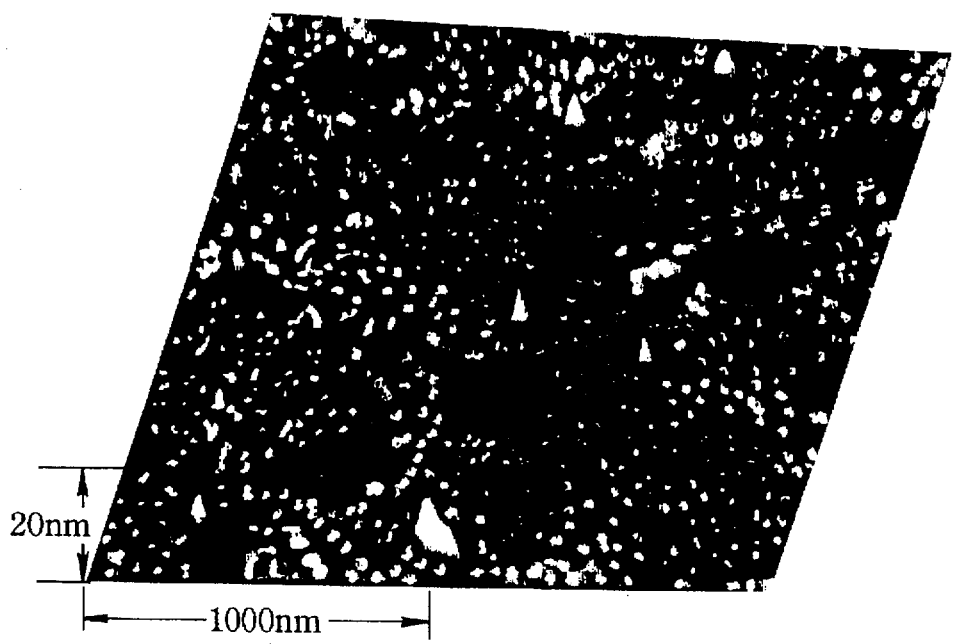
FIG. 2 is a schematic perspective view showing a surface roughness of a conventionally etched first layer.

If a conventional $SiO_2$ layer of which surface is flat is etched with hydrofluoric acid, the etched layer becomes minutely rough (see FIG. 2). However, the etched layer's surface is not desirably rough. In fact, the values of Rsk and Rkr of the etched layer become less than 0 and less than 3, respectively. In this case, a water-repellent layer can not be sufficiently held on the etched layer. Thus, the formed multilayered film becomes inferior in durability of water repellency.

The second layer according to the third aspect of the present invention is prepared by a method comprising the steps of: (a) preparing a second coating mixture by mixing together a fluoroalkylsilane, tin oxide particles doped with antimony oxide, a silicon compound, water, an organic solvent and an acid; (b) applying the second coating mixture to the first metal oxide layer so as to form a second layer on the first layer; and (c) heating the second layer at a temperature ranging from 100° to 400° C.

It should be noted that the above descriptions concerning the fluoroalkylsilane, the doped tin oxide particles, the silicon compound and the organic solvent according to the second aspect of the present invention are also applicable to or true of these substances according to the third aspect of the present invention, except the following.

It is preferable that the second coating mixture contains 0.04–2 wt % of the doped tin oxide particles so as to improve durability of water repellency of the second layer. If it is less than 0.04 wt %, this improvement becomes less. If it is greater than 2 wt %, the desired water repellency can not be obtained.

It is preferable that the second coating mixture contains 0.03–2 wt % of the silicon compound so as to stably hold the doped tin oxide fine particles on the first layer. If it is less than 0.03 wt %, the effect of the silicon compound addition becomes insufficient. If it is greater than 2 wt %, the desired water repellency can not be obtained.

It is preferable that the second coating mixture contains 0.005–15 wt % of water. If it is less than 0.005 wt %, hydrolysis of the fluoroalkylsilane does not proceeds sufficiently. Thus, the multilayered film becomes insufficient in water repellency. If it is greater than 15 wt %, polycondensation of the fluoroalkylsilane itself or between the fluoroalkylsilane and the silicon compound tends to occur. The thus formed polycondensation product will flocculate in the second coating mixture. With this, the multilayered film becomes insufficient in water repellency, and stability of the second coating mixture during its storage will become low.

The acid for the preparation of the second layer serves as a catalyst for hydrolyzing the fluoroalkylsilane. Examples of the acid are sulfuric acid, nitric acid, hydrochloric acid, phosphoric acid, aromatic sulfonic acids and aliphatic sulfonic acids. More preferable examples of the acid are strong acids such as sulfuric acid, nitric acid and hydrochloric acid.

It is preferable that the second coating mixture contains the acid so as to control the molar ratio of the acid to the fluoroalkylsilane within a range of from $5.0 \times 10^{-4}:1$ to $2.0 \times 10^{-2}:1$. If it is less than $5.0 \times 10^{-4}$, the effect of the acid addition becomes insufficient. If it is greater than $2.0 \times 10^{-2}:1$, polycondensation of the fluoroalkylsilane itself or between the fluoroalkylsilane and the silicon compound tends to occur. The thus formed polycondensation product will flocculate in the second coating mixture. With this, the multilayered film becomes insufficient in water repellency, and stability of the second coating mixture during its storage will become low.

It is preferable that the second layer is heated at a temperature ranging from 100° to 400° C. for a period ranging from about 20 to about 40 min. If it is lower than 100° C. or higher than 400° C., durability of water repellency of the second layer does not improve. The heating temperature of the second layer is more preferably in a range from 150° to 350° C. and still more preferably in a range from 200° to 300° C.

As the coating method of the second coating mixture, it is usual to use dip coating, spraying, flow coating or spin coating.

The following nonlimitative Examples 16–28 are in accordance with the third aspect of the present invention, and the following Comparative Examples 15–26 are not in accordance with the third aspect of the present invention.

EXAMPLE 16

In this example, the process of forming the first metal oxide layer on the glass substrate in accordance with Example 4 was repeated. The thus formed first metal oxide layer had a thickness of about 100 nm after the heating at a temperature of about 600° C. The first layer's surface was observed with a scanning probe microscope of Type NV2, 000 of OLYMPUS OPTICS CO. using a mode of an atomic force microscope, a scanning line number of 256 and a scanning size of 4,000 nm. With this observation, it was found that the first layer's surface was minutely rough and had numerous micro-pits and micro-projections. The values of Ry, Ra, Rz and Sm of the first layer's surface were 23.9 nm, 6.2 nm, 22.1 nm and 621 nm, respectively. The diameters of the micro-pits and micro-projections were not larger than about 672 nm. The average diameter of the micro-pits and micro-projections was about 50 nm. Rsk and Rkr of the first layer's surface were respectively satisfactory. That is, the values of Rsk and Rkr were respectively in the preferable ranges. In other words, the value of Rsk was in a range which is not lower than and close to 0, and the value of Rkr was in a range which is not lower than and close to 3.

A second water-repellent layer of the third aspect of the present invention was formed on the first metal oxide layer in accordance with the following steps. A second coating mixture (the total weight: 8.13 g) was prepared by mixing together 1 g of a silica sol (solvent: ethanol) as the silicon compound, 0.01 g of T-1 (the tin oxide fine particles doped with antimony oxide), 5.72 g of isopropyl alcohol, 1 g of the fluoroalkylsilane, 0.2 g of a nitric acid aqueous solution (pH: 1.5) and 0.2 g of water. The silica sol had an average molecular weight of about 3,000 and contained 1 wt % of solid matter. After the mixing of these substances, the second coating mixture was stirred for about 30 min. The thus prepared second coating mixture contained 0.12 wt % of the silicon compound, 0.12 wt % of the doped tin oxide, 12.3 wt % of the fluoroalkylsilane, 82.54 wt % of the organic solvent and 4.92 wt % of water. The molar ratio of the acid to the fluoroalkylsilane was $3.70 \times 10^{-3}:1$. Then, the second coating mixture was applied to the first layer, in the same atmosphere as that of the application of the first coating mixture, so as to form a second film on the first layer. Then, the thus coated glass substrate was heated at a temperature of about 250° C. for about 30 min so as to form a second water-repellent layer on the first metal oxide layer.

To evaluate water repellency of the film, the contact angle of water drop on the film was measured by a contact angle meter in the atmosphere of a temperature of about 25° C.

To evaluate the durability and weatherability of the multilayered film, the same durability and weatherability tests as those of Example 4 were conducted. The test results are shown in Table 3.

Even one month after the preparation of the second coating mixture, it was found that the stored second coating mixture was stable. That is, flocculation did not occur and the tin oxide particles were well dispersed in the second coating mixture.

Each of the glass substrates having thereon the multilayered water-repellent films in accordance with the following Examples 17–28 and Comparative Examples 15–26 was also subjected to the same tests of Example 4. The results are shown in Table 3.

EXAMPLE 17

In this example, the first metal oxide layer was formed in accordance with Example 5. The second water-repellent layer was formed in accordance with Example 16 except that the composition of the second coating mixture was changed. In fact, the second coating mixture (the total weight: 1000.0 g) was prepared by mixing together 100 g of the silica sol of Example 16, 1 g of T-1, 888 g of isopropyl alcohol, 1 g of the fluoroalkylsilane, 0.2 g of the nitric acid aqueous solution (pH: 1.5) and 9.8 g of water. The second coating mixture contained 0.1 wt % of the silicon compound, 0.1 wt % of the doped tin oxide particles, 0.1 wt % of the fluoroalkylsilane, 98.7 wt % of the organic solvent and 1 wt % of water. The molar ratio of the acid to the fluoroalkylsilane was the same as that of Example 16.

The first metal oxide layer had a thickness of about 50 nm. Its surface was observed with the same microscope as that of Example 16. With this observation, it was found that the first layer's surface was minutely rough and had numerous micro-pits and micro-projections. The values of Ry, Ra, Rz and Sm of the first layer's surface were 12.2 nm, 3.4 nm, 11.0 nm and about 423 nm, respectively. The diameters of the micro-pits and micro-projections were not larger than about 510 nm. The average diameter of the micro-pits and micro-projections was about 400 nm. As is the same as Example 16, Rsk and Rkr of the first layer's surface were respectively satisfactory.

EXAMPLE 18

In this example, the first metal oxide layer was formed in accordance with Example 6. The second water-repellent layer was formed in accordance with Example 16 except that the composition of the second coating mixture was changed. In fact, the second coating mixture (the total weight: 5.0 g) was prepared by mixing together 1 g of the silica sol of Example 16, 0.01 g of T-1, 2.59 g of isopropyl alcohol, 1 g of the fluoroalkylsilane, the nitric acid aqueous solution (pH: 1.5) and 0.2 g of water. The second coating mixture contained 0.2 wt % of the silicon compound, 0.2 wt % of the doped tin oxide particles, 20 wt % of the fluoroalkylsilane, 71.6 wt % of the organic solvent and 8 wt % of water. The molar ratio of the acid to the fluoroalkylsilane was the same as that of Example 16. The second coating mixture was stable during its storage as that of Example 16.

The first metal oxide layer had a thickness of about 60 nm. Its surface was observed with the same microscope as that of Example 16. With this observation, it was found that the first layer's surface was minutely rough and had numerous micro-pits and micro-projections. The values of Ry, Re, Rz and Sm of the first layer's surface were 11.1 nm, 2 nm, 10.0 nm and about 358 nm, respectively. The diameters of the micro-projections were in a range of from about 380 to about 500 nm, and the average diameter of those was about 400 nm. As is the same as Example 16, Rsk and Rkr of the first layer's surface were respectively satisfactory.

EXAMPLE 19

In this example, the first metal oxide layer was formed in accordance with Example 7. The second water-repellent layer was formed in accordance with Example 16 except that the composition of the second coating mixture was changed. In fact, the second coating mixture (the total weight: 25.00 g) was prepared by mixing together 1 g of the silica sol of Example 16, 0.01 g of T-1, 22.59 g of isopropyl alcohol, 1 g of the fluoroalkylsilane, 0.2 g of the nitric acid aqueous solution (pH: 1.5) and 0.2 g of water. The second coating mixture contained 0.04 wt % of the silicon compound, 0.04 wt % of the doped tin oxide particles, 4 wt % of the fluoroalkylsilane, 94.32 wt % of the organic solvent and 1.6 wt % of water. The molar ratio of the acid to the fluoroalkylsilane was the same as that of Example 16. The second coating mixture was stable during its storage as that of Example 16.

The first metal oxide layer had a thickness of about 80 nm. Its surface was observed with the same microscope as that of Example 16. With this observation, it was found that the first layer's surface was minutely rough and had numerous micro-pits and micro-projections. The values of Ry, Ra, Rz and Sm of the first layer's surface were 20.2 nm, 4.3 nm, 18.3 nm and about 452 nm, respectively. The diameters of the micro-pits and/or the micro-projections were in a range of from about 10 to about 50 nm, and the average diameter of those was about 30 nm. As is the same as Example 16, Rsk and Rkr of the first layer's surface were respectively satisfactory.

EXAMPLE 20

In this example, Example 1 was substantially repeated for preparing the first metal oxide layer except that the third sol of Example 1 was omitted. In fact, the first and second sols of Example 1 were diluted with 350 g of isopropyl alcohol. This mixture was stirred at room temperature for about 10 hr, thereby preparing a first coating mixture. The molar ratio of the solid matter (polymer) contained in the second sol to that contained in the first sol was 3.5:1 on a metal oxide basis.

Then, the first coating solution was applied to the glass substrate by dip coating in an atmosphere of a temperature of about 23° C. and a relative humidity of about 50% so as to form thereon a first sol film. The thus coated glass substrate was heated at a temperature of about 100° C. for about 30 min. With this, a $SiO_2$ gel film having a thickness of about 150 nm was formed on the glass substrate. Then, it was heated at a temperature of about 600° C. for about 3 min. With this, a first metal oxide layer of $SiO_2$ having a thickness of about 90 nm was formed on the glass substrate. The first metal oxide layer's surface was observed with the same microscope as that of Example 16. With this observation, it was found that the first layer's surface was minutely rough and had numerous micro-pits and micro-projections. The values of Ry, Ra, Rz and Sm of the first layer's surface were 35.5 nm, 7.8 nm, 33.1 nm and not larger than about 657 nm; respectively. The diameters of the micro-pits and micro-projections were in a range of from about 10 to about 50 nm, and the average diameter of those was about 30 nm. As is the same as Example 16, Rsk and Rkr of the first layer's surface were respectively satisfactory.

A second water-repellent layer was formed in accordance with Example 16 except that the composition of the second coating mixture was changed. In fact, the second coating mixture (the total weight: 8.00 g) was prepared by mixing together 1 g of the silica sol of Example. 16, 0.16 g of T-1, 5.44 g of isopropyl alcohol, 1 g of the fluoroalkylsilane, 0.2 g of the nitric acid aqueous solution (pH: 1.5) and 0.2 g of water. The second coating mixture contained 0.12 wt % of the silicon compound, 2 wt % of the doped tin oxide particles, 12.5 wt % of the fluoroalkylsilane, 80.38 wt % of the organic solvent and 5 wt % of water. The molar ratio of the acid to the fluoroalkylsilane was the same as that of Example 16. The second coating mixture was stable during its storage as that of Example 16.

EXAMPLE 21

In this example, Example 20 was modified with respect to the first coating mixture's composition for preparing the first metal oxide layer. In fact, the first metal oxide layer was formed on a glass substrate in accordance with Example 20 by using the first coating mixture according to Example 1 containing the first, second and third sols. The first metal oxide layer of a mixture of $SiO_2$ and $TiO_2$ had a thickness of about 70 nm. The first metal oxide layer's surface was observed with the same microscope as that of Example 16. With this observation, it was found that the first layer's surface was minutely rough and had numerous micro-pits and micro-projections. The values of Ry, Ra, Rz and Sm of the first layer's surface were 15.8 nm, 4.7 nm, 14.4 nm and about 488 nm, respectively. The diameters of the micro-pits and micro-projections were in a range of from about 10 to about 50 nm, and the average diameter of those was about 30 nm. As is the same as Example 16, Rsk and Rkr of the first layer's surface were respectively satisfactory.

A second water-repellent layer was formed in accordance with Example 16 except that the composition of the second coating mixture was changed. In fact, the second coating mixture (the total weight: 50.0 g) was prepared by mixing together 2 g of the silica sol of Example 16, 0.01 g of T-1, 46.59 g of isopropyl alcohol, 1 g of the fluoroalkylsilane, 0.2 g of the nitric acid aqueous solution (pH: 1.5) and 0.2 g of water. The second coating mixture contained 0.125 wt % of the silicon compound, 0.125 wt % of the doped tin oxide particles, 12.5 wt % of the fluoroalkylsilane, 86.245 wt % of the organic solvent and 0.005 wt % of water. The molar ratio of the acid to the fluoroalkylsilane was $5.60 \times 10^{-3}$:1. The second coating mixture was stable during its storage as that of Example 16.

EXAMPLE 22

In this example, Example 20 was modified with respect to the first coating mixture's composition for preparing the first metal oxide layer. In fact, the first metal oxide layer was formed on a glass substrate in accordance with Example 20 by using the first coating mixture according to Example 3 containing the first, second and third sols. The first metal oxide layer of a mixture of $SiO_2$ and $TiO_2$ had a thickness of about 50 nm. The first metal oxide layer's surface was observed with the same microscope as that of Example 16. With this observation, it was found that the first layer's surface was minutely rough and had numerous micro-pits and micro-projections. The values of Ry, Ra, Rz and Sm of the first layer's surface were 17.8 nm, 5.3 nm, 16.2 nm and about 414 nm, respectively. The diameters of the micro-pits and micro-projections were in a range of from about 10 to about 50 nm, and the average diameter of those was about 30 nm. As is the same as Example 16, Rsk and Rkr of the first layer's surface were respectively satisfactory.

A second water-repellent layer was formed in accordance with Example 16 except that the composition of the second coating mixture was changed. In fact, the second coating mixture (the total weight: 6.42 g) was prepared by mixing together 1 g of the silica sol of Example 16, 0.01 g of T-1, 3.21 g of isopropyl alcohol, 1 g of the fluoroalkylsilane, 0.2 g of the nitric acid aqueous solution (pH: 1.5) and 1 g of water. The second coating mixture contained 0.125 wt % of the silicon compound, 0.125 wt % of the doped tin oxide particles, 12.5 wt % of the fluoroalkylsilane, 72.25 wt % of the organic solvent and 15 wt % of water. The molar ratio of the acid to the fluoroalkylsilane was the same as that of Example 16. The second coating mixture was stable during its storage as that of Example 16.

EXAMPLE 23

In this example, Example 16 was repeated except at the composition of the second coating mixture was changed. In fact, the second coating mixture (the total weight; 8.00 g) was prepared by mixing together 1 g of the silica sol of Example 16, 0.01 g of T-1, 5.59 g of isopropyl alcohol, 1 g of the fluoroalkylsilane, 0.11 g of the nitric acid aqueous solution (pH: 1.5) and 0.29 g of water. The second coating mixture contained 0.125 wt % of the silicon compound, 0.125 wt % of the doped tin oxide particles, 12.5 wt % of the fluoroalkylsilane, 82.25 wt % of the organic solvent and 5 wt % of water. The molar ratio of the acid to the fluoroalkylsilane was $5.10 \times 10^{-4}$:1. The second coating mixture was stable during its storage as that of Example 16.

The first metal oxide layer of $SiO_2$ had a thickness of about 100 nm. The first metal oxide layer's surface was observed with the same microscope as that of Example 16. With this observation, it was found that the first layer's surface was minutely rough and had numerous micro-pits mid micro-projections. The values of Ry, Ra, Rz and Sm of the first layer's surface were 23.9 nm, 6.2 nm, 22.1 nm and about 672 nm, respectively. The average diameter of the micro-pits and micro-projections was about 50 nm. As is the same as Example 16, Rsk and Rkr of the first layer's surface were respectively satisfactory.

EXAMPLE 24

In this example, Example 18 was repeated except that the composition of the second coating mixture was changed. In fact, the second coating mixture (the total weight: 8.00 g) was prepared by mixing together 1 g of the silica sol of Example 16, 0.01 g of T-1, 5.59 g of isopropyl alcohol, 1 g of the fluoroalkylsilane and 0.4 g of the nitric acid aqueous solution (pH: 1.5), Each component's content of the second coating mixture by wt % was the same as that of Example 23. The molar ratio of the acid to the fluoroalkylsilane was $1.90 \times 10^{-2}$:1. The second coating mixture was stable during its storage as that of Example 16.

The first metal oxide layer of $SiO_2$ had a thickness of about 60 nm. The first metal oxide layer's surface was observed with the same microscope as that of Example 16. With this observation, it was found that the first layer's surface was minutely rough end had numerous micro-pits and micro-projections. The values of Ry, Ra, Rz and Sm of the first layer's surface were 11.1 nm, 2.0 nm, 10.0 nm and about 358 nm, respectively. The average diameter of the micro-pits and micro-projections was about 400 nm, As is the same as Example 16, Rsk and Rkr of the first layer's surface were respectively satisfactory.

EXAMPLE 25

In this example, Example 17 was repeated except that the composition of the second coating mixture was changed. In fact, the second coating mixture (the total weight: 24.0 g) was prepared by mixing together 0.75 g of the silica sol of Example 16, 0.01 g of T-1, 22.84 g of isopropyl alcohol, 1 g of the fluoroalkylsilane, 0.2 g of the nitric acid aqueous solution (pH: 1.5) and 0.2 g of water. The second coating mixture contained 0.03 wt % of the silicon compound, 0.04 wt % of the doped tin oxide particles, 4 wt % of the fluoroalkylsilane, 94.33 wt % of the organic solvent and 1.6 wt % of water. The molar ratio of the acid to the fluoroalkylsilane was $1.90 \times 10^{-3}$:1. The second coating mixture was stable during its storage as that of Example 16.

The first metal oxide layer of $SiO_2$ had a thickness of about 50 nm. The first metal oxide layer's surface was observed with the same microscope as that of Example 16. With this observation, it was found that the first layer's surface was minutely rough and had numerous micro-pits and micro-projections. The values of Ry, Ra, Rz and Sm of the first layer's surface were 12.2 nm, 3.4 nm, 11.0 nm and about 510 nm, respectively. The average diameter of the micro-pits and micro-projections was about 400 nm. As is the same as Example 16, Rsk and Rkr of the first layer's surface were respectively satisfactory.

EXAMPLE 26

In this example, Example 19 was repeated except that the composition of the second coating mixture was changed. In fact, the second coating mixture (the total weight: 8.00 g) was prepared by mixing together 1.6 g of the silica sol of Example 16, 0.01 g of T-1, 4.99 g of isopropyl alcohol, 1 g of the fluoroalkylsilane, 0.2 g of the nitric acid aqueous solution (pH: 1.5) and 0.2 g of water. The second coating mixture contained 2 wt % of the silicon compound, 0.12 wt % of the doped tin oxide particles, 12.5 wt % of the fluoroalkylsilane, 80.38 wt % of the organic solvent and 5 wt % of water. The molar ratio of the acid to the fluoroalkylsilane was $1.90 \times 10^{-3}:1$. The second coating mixture was stable during its storage as that of Example 16.

The first metal oxide layer of $SiO_2$ had a thickness of about 80 nm. The first metal oxide layer's surface was observed with the same microscope as that of Example 16. With this observation, it was found that the first layer's surface was minutely rough and had numerous micro-pits and micro-projections. The values of Ry, Ra, Rz and Sm of the first layer's surface were 20.2 nm, 4.3 nm, 18.3 nm and about 452 nm, respectively. The average diameter of the micro-pits and micro-projections was about 30 nm. As is the same as Example 16, Rsk and Rkr of the first layer's surface were respectively satisfactory.

EXAMPLE 27

In this example, Example 16 was repeated except that the composition of the second coating mixture was changed. In fact, the second coating mixture (the total weight: 7.4 g) was prepared by mixing together 1 g of a sol made by Catalyst and Chemicals Industry Co., 5 g of isopropyl alcohol, 1 g of the fluoroalkylsilane and 0.4 g of the nitric acid aqueous solution (pH: 1.5). This sol contained 2.5 wt % of solid matter. In more detail, this sol contained 1.11 wt % of the silicon compound and 1.39 wt % of the doped tin oxide particles (particle size: about 5 nm). The second coating mixture contained 0.15 wt % of the silicon compound, 0.19 wt % of the doped tin oxide particles, 13.51 wt % of the fluoroalkylsilane, 80.75 wt % of the organic solvent and 5.4 wt % of water. The molar ratio of the acid to the fluoroalkylsilane was $7.40 \times 10^{-4}:1$. The second coating mixture was stable during its storage as that of Example 16.

The first metal oxide layer of $SiO_2$ had a thickness of about 100 nm. The first metal oxide layer's surface was observed with the same microscope as that of Example 16. With this observation, it was found that the first layer's surface was minutely rough and had numerous micro-pits and micro-projections. The values of Ry, Ra, Rz and Sm of the first layer's surface were 23.9 nm, 6.2 nm, 22.1 nm and about 672 nm, respectively. The average diameter of the micro-pits and micro-projections was about 50 nm. As is the same as Example 16, Rsk and Rkr of the first layer's surface were respectively satisfactory.

EXAMPLE 28

In this example, Example 17 was repeated except that the composition of the second coating mixture was changed. In fact, the second coating mixture (the total weight: 27.4 g) was prepared by mixing together 1 g of the sol of Example 27, 25 g of isopropyl alcohol, 1 g of the fluoroalkylsilane and 0.4 g of the nitric acid aqueous solution (pH: 1.5). The second coating mixture contained 0.04 wt % of the silicon compound, 0.05 wt % of the doped tin oxide particles, 3.65 wt % of the fluoroalkylsilane, 94.8 wt % of the organic solvent and 1.46 wt % of water. The molar ratio of the acid to the fluoroalkylsilane was $7.40 \times 10^{-4}:1$. The second coating mixture was stable during its storage as that of Example 16.

The first metal oxide layer of $SiO_2$ had a thickness of about 50 nm. The first moral oxide layer's surface was observed with the same microscope as that of Example 16. With this observation, it was found that the first layer's surface was minutely rough and had numerous micro-pits and micro-projections. The values of Ry, Ra, Rz and Sm of the first layer's surface were 12.2 nm, 3.4 nm, 11.0 nm and about 423 nm, respectively. The average diameter of the micro-pits and micro-projections was about 400 nm. As is the same as Example 16, Rsk and Rkr of the first layer's surface were respectively satisfactory.

COMPARATIVE EXAMPLE 15

In this comparative example, the first metal oxide layer was formed on a glass substrate in accordance with Comparative Example 4. That is, the first silica sol of Example 4 was omitted and only about 200 g of the second silica sol of Example 4 was used as the first coating mixture for the preparation of the first layer.

The formed first metal oxide layer of $SiO_2$ had a thickness of about 150 nm. Although the first layer's surface had thereon micro-pits having an average diameter of about 2 nm, the first layer's surface was relatively flat.

The second water-repellent layer was formed in accordance with Example 16 except that the composition of the second coating mixture was changed. The fluoroalkylsilane content of the second coating mixture was lower than the preferable range (0.10–20 wt %) of the present invention. In fact, the second coating mixture (the total weight: 1000.5 g) was prepared by mixing together 100 g of the silica sol of Example 16, 1 g of T-1, 889 g of isopropyl alcohol, 0.5 g of the fluoroalkylsilane and 0.2 g of the nitric acid aqueous solution (pH: 1.5) and 9.8 g of water. The second coating mixture contained 0.1 wt % of the silicon compound, 0.1 wt % of the doped tin oxide particles, 0.05 wt % of the fluoroalkylsilane, 98.75 wt % of the organic solvent and 1 wt % of water. The molar ratio of the acid to the fluoroalkylsilane was $3.70 \times 10^{-3}:1$.

COMPARATIVE EXAMPLE 16

In this comparative example, Comparative Example 15 was repeated except that the composition of the second coating mixture was changed. The fluoroalkylsilane content of the second coating mixture was higher than the preferable range (0.10–20 wt %) of the present invention. In fact, the second coating mixture (total weight: 4.00 g) was prepared by mixing together 1 g of the silica sol of Example 16, 0.01 g of T-1, 1.59 g of isopropyl alcohol, 1 g of the fluoroalkylsilane, 0.2 g of the nitric acid aqueous solution (pH: 1.5) and 0.2 g of water. The second coating mixture contained 0.25 wt % of the silicon compound, 0.25 wt % of doped tin oxide particles, 25 wt % of the fluoroalkylsilane, 64.5 wt % of the organic solvent and 10 wt % of water. The molar ratio of the acid to the fluoroalkylsilane was $3.70 \times 10^{-3}:1$.

The formed first metal oxide layer was substantially the same as that of Comparative Example 15 in thickness and surface configuration.

The second coating mixture could not be uniformly applied to the first metal oxide layer because the solvent content of the second coating mixture was too low and the second coating mixture increased in viscosity. Furthermore, about three days after the preparation of the second coating mixture, flocculation occurred and the tin oxide particles precipitated in the second coating mixture.

COMPARATIVE EXAMPLE 17

In this comparative example, Comparative Example 15 was repeated except that the composition of the second coating mixture was changed. The doped tin oxide particles content of the second coating mixture was lower than the preferable range (0.04–2 wt %) of the present invention. In fact, the second coating mixture (total weight: 50.0 g) was prepared by mixing together 2 g of the silica sol of Example 16, 0.01 g of T-1, 46.59 g of isopropyl alcohol, 1 g of the fluoroalkylsilane, 0.2 g of the nitric acid aqueous solution (pH: 1.5) and 0.2 g of water. The second coating mixture contained 0.04 wt % of the silicon compound, 0.02 wt % of the doped tin oxide particles, 2 wt % of the fluoroalkylsilane, 97.14 wt % of the organic solvent and 0.8 wt % of water. The molar ratio of the acid to the fluoroalkylsilane was $3.70 \times 10^{-3}:1$.

The formed first metal oxide layer was substantially the same as that of Comparative Example 15 in thickness and surface configuration.

COMPARATIVE EXAMPLE 18

In this comparative example, Comparative Example 15 was repeated except that the composition of the second coating mixture was changed. The doped tin oxide particles content of the second coating mixture was higher than the preferable range (0.04–2 wt %) of the present invention. In fact, the second coating mixture (total weight: 8.00 g) was prepared by mixing together 1 g of the silica sol of Example 16, 0.2 g of T-1, 5.4 g of isopropyl alcohol, 1 g of the fluoroalkylsilane, 0.2 g of the nitric acid aqueous solution (pH: 1.5) and 0.2 g of water. The second coating mixture contained 0.12 wt % of the silicon compound, 2.5 wt % of the doped tin oxide particles, 12.5 wt % of the fluoroalkylsilane, 79.88 wt % of the organic solvent and 5 wt % of water. The molar ratio of the acid to the fluoroalkylsilane was $3.70 \times 10^{-3}:1$.

The formed first metal oxide layer was substantially the same as that of Comparative Example 15 in thickness and surface configuration.

COMPARATIVE EXAMPLE 19

In this comparative example, the first metal oxide layer was formed in accordance with Example 5. The second water-repellent layer was formed in accordance with Example 16 except that the composition of the second coating mixture was changed. The water content of the second coating mixture was lower than the preferable range (0.005–15 wt %) of the present invention. In fact, the second coating mixture (the total weight: 80.005 g) was prepared by mixing together 10 g of the silica sol of Example 16, 0.1 g of T-1, 59.9 g of isopropyl alcohol, 10 of the fluoroalkylsilane and 0.005 g of a 60% nitric acid aqueous solution. The second coating mixture contained 0.125 wt % of the silicon compound, 0.125 wt % of the doped tin oxide particles, 12.5 wt % of the fluoroalkylsilane, 87.247 wt % of the organic solvent and 0.003 wt % of water. The molar ratio of the acid to the fluoroalkylsilane was $2.80 \times 10^{-3}$.

The first metal oxide layer of $SiO_2$ had a minutely rough surface having micro-pits and micro-projections. The average diameter of the micro-pits and micro-projections was about 400 nm.

COMPARATIVE EXAMPLE 20

In this comparative example, the first metal oxide layer was formed in accordance with Example 5. The second water-repellent layer was formed in accordance with Example 16 except that the composition of the second coating mixture was changed. The water content of the second coating mixture was higher than the preferable range (0.005–15 wt %) of the present invention. In fact, the second coating mixture (the total weight: 8.00 g) was prepared by mixing together 1 g of the silica sol of Example 16, 0.01 g of T-1, 4.39 g of isopropyl alcohol, 1 g of the fluoroalkylsilane and 0.2 g of the nitric acid aqueous solution (pH: 1.5) and 1.4 g of water. The second coating mixture contained 0.125 wt % of the silicon compound, 0.125 wt % of the doped tin oxide particles, 12.5 wt % of the fluoroalkylsilane, 67.25 wt % of the organic solvent and 20 wt % of water. The molar ratio of the acid to the fluoroalkylsilane was $3.70 \times 10^{-3}$. About one day after the preparation of the second coating mixture, flocculation occurred and the tin oxide particles precipitated in the second coating mixture.

The first metal oxide layer of $SiO_2$ had a minutely rough surface having micro-pits and micro-projections. The average diameter of the micro-pits and micro-projections was about 400 nm.

COMPARATIVE EXAMPLE 21

In this comparative example, the first metal oxide layer was formed in accordance with Example 5. The second water-repellent layer was formed in accordance with Example 16 except that the composition of the second coating mixture was changed. In fact, the second coating mixture (the total weight: 8.00 g) was prepared by mixing together 1 g of the silica sol of Example 16, 0.01 g of T-1, 5.59 g of isopropyl alcohol, 1 g of the fluoroalkylsilane 0.05 g of a nitric acid aqueous solution (pH: 2.1) and 0.35 g of water. The second coating mixture contained 0.125 wt % of the silicon compound, 0.125 wt % of the doped tin oxide particles, 12.5.wt % of the fluoroalkylsilane, 82.25 wt % of the organic solvent and 5 wt % of water. The molar ratio of the acid to the fluoroalkylsilane was $2.30 \times 10^{-4}$. This value was lower than the preferable range (from $5 \times 10^{-4}$ to $2 \times 10^{-2}$) of the present invention.

The first metal oxide layer of $SiO_2$ had a minutely rough surface having micro-pits and micro-projections. The average diameter of the micro-pits and micro-projections was about 400 nm.

COMPARATIVE EXAMPLE 22

In this comparative example, the first metal oxide layer was formed in accordance with Example 5. The second water-repellent layer was formed in accordance with Example 16 except that the composition of the second coating mixture was changed. In fact, the second coating mixture (the total Weight: 8.00 g) was prepared by mixing together 1 g of the silica sol of Example 16, 0.01 g of T-1, 5.59 g of isopropyl alcohol, 1 g of the fluoroalkylsilane and 0.4 g of a nitric acid aqueous solution (pH: 1). Each component's content of the second coating mixture was the same as that of Comparative Example 21. The molar ratio of the acid to the fluoroalkylsilane was $2.40 \times 10^{-2}$. This value was higher than the preferable range (from $5.0 \times 10^{-4}$ to $2.0 \times 10^{2}$) of the present invention. About one day after the preparation of the second coating mixture, flocculation occurred and the tin oxide particles precipitated the in the second coating mixture.

The first metal oxide layer of $SiO_2$ had a minutely rough surface having micro-pits and micro-projections. The average diameter of the micro-pits and micro-projections was about 400 nm.

COMPARATIVE EXAMPLE 23

In this comparative example, the first metal oxide layer was formed in accordance with Example 5. The second water-repellent layer was formed in accordance with Example 16 except that the composition of the second coating mixture was changed. The silicon compound content of the second coating mixture was lower than the preferable range (0.03–2 wt %) of the present invention. In fact, the second coating mixture (the total weight: 50.0 g) was prepared by mixing together 1 g of the silica sol of Example 16, 0.1 g of T-1, 47.5 g of isopropyl alcohol, 1 g of the fluoroalkylsilane, 0.2 g of a nitric acid aqueous solution (pH: 1.5) and 0.2 g of water. The second coating mixture contained 0.02 wt % of the silicon compound, 0.2 wt % of the doped tin oxide particles, 2 wt % of the fluoroalkylsilane, 96.98 wt % of the organic solvent and 0.8 wt % of water. The molar ratio of the acid to the fluoroalkylsilane was $1.90 \times 10^{-3}$.

The first metal oxide layer of $SiO_2$ had a minutely rough surface having micro-pits and micro-projections. The average diameter of the micro-pits and micro-projections was about 400 nm.

COMPARATIVE EXAMPLE 24

In this comparative example, the first metal oxide layer was formed in accordance with Example 5. The second water-repellent layer was formed in accordance with Example 16 except that the composition of the second coating mixture was changed. The silicon compound content of the second coating mixture was higher than the preferable range (0.03–2 wt %) of the present invention. In fact, the second coating mixture (the total weight: 8.00 g) was prepared by mixing together 2 g of a silica sol, 0.01 g of T-1, 4.59 g of isopropyl alcohol, 1 g of the fluoroalkylsilane, 0.2 g of a nitric acid aqueous solution (pH: 1) and 0.2 g of water. This silica sol had an average molecular weight of about 3,000 and contained 10 wt % of solid matter. The second coating mixture contained 2.5 wt % of the silicon compound, 0.12 wt % of the doped tin oxide particles, 12.5 wt % of the fluoroalkylsilane, 79.88 wt % of the organic solvent and 5 wt % of water. The molar ratio of the acid to the fluoroalkylsilane was $1.90 \times 10^{-3}$. About three days after the preparation of the second coating mixture, flocculation occurred and the tin oxide particles precipitated in the second coating mixture.

The first metal oxide layer of $SiO_2$ had a minutely rough surface having micro-pits and micro-projections. The average diameter of the micro-pits and micro-projections was about 400 nm.

COMPARATIVE EXAMPLE 25

In this comparative example, Comparative Example 15 was repeated except that the second coating mixture according to Example 16 was used. Thus, each component's content of the second mixture was the same as that of Example 16. The molar ratio of the acid to the fluoroalkylsilane was also the same as that of Example 16.

The formed first metal oxide layer was substantially the same as that of Comparative Example 15 in thickness and surface configuration.

COMPARATIVE EXAMPLE 26

In this comparative example, Comparative Example 15 was repeated except that the second coating mixture according Example 22 was used. Thus, each component's content of the second mixture was the same as that of Example 22. The molar ratio of the acid to the fluoroalkylsilane was also the same as that of Example 22.

The formed first metal oxide layer was substantially the same as that of Comparative Example 15 in thickness and surface configuration.

TABLE 3

| | Initial Contact Angle (°) | Contact Angle After Weatherability Test (°) | Contact Angle After Durability Test (°) |
|---|---|---|---|
| Example 16 | 112 | 103 | 100 |
| Example 17 | 112 | 102 | 100 |
| Example 18 | 114 | 103 | 101 |
| Example 19 | 114 | 104 | 100 |
| Example 20 | 112 | 104 | 101 |
| Example 21 | 111 | 100 | 100 |
| Example 22 | 114 | 104 | 100 |
| Example 23 | 113 | 102 | 99 |
| Example 24 | 115 | 102 | 100 |
| Example 25 | 112 | 104 | 100 |
| Example 26 | 111 | 103 | 100 |
| Example 27 | 113 | 102 | 100 |
| Example 28 | 111 | 101 | 99 |
| Com. Example 15 | 100 | 78 | 72 |
| Com. Example 16 | 113 | 92 | 78 |
| Com. Example 17 | 112 | 85 | 89 |
| Com. Example 18 | 100 | 76 | 75 |
| Com. Example 19 | 99 | 88 | 89 |
| Com. Example 20 | 112 | 95 | 94 |
| Com. Example 21 | 100 | 87 | 90 |
| Com. Example 22 | 110 | 97 | 94 |
| Com. Example 23 | 112 | 91 | 92 |
| Com. Example 24 | 109 | 90 | 89 |
| Com. Example 25 | 111 | 87 | 90 |
| Com. Example 26 | 113 | 92 | 89 |

What is claimed is:

1. A combination of a glass substrate and a multilayered water-repellent film formed on the glass substrate, the film having a first metal oxide layer having a minutely rough surface having on the surface micro-pits and/or micro-projections and a second water-repellent layer, the film being prepared by:
   (a) forming the first metal oxide layer on the glass substrate such that the first metal oxide layer has a minutely rough surface having on the surface micro-pits and/or micro-projections;
   (b) preparing a coating mixture comprising 0.10–20 wt % of a fluoroalkylsilane, 0.10–2 wt % of tin oxide particles doped with antimony oxide, 0.10–2 wt % of a silicon compound, water and an organic solvent;
   (c) applying the coating mixture to the first metal oxide layer so as to form the second layer on the first layer; and
   (d) heating the second layer at a temperature ranging from 100° to 300° C.

2. A combination according to claim 1, wherein the average diameter of the micro-pits and/or micro-projections of the first metal oxide layer is in the range of from 5 to 500 nm.

3. A combination according to claim 1, wherein the first metal oxide layer has a thickness ranging from 10 to 300 nm.

4. A combination according to claim 1, wherein average particle size of the tin oxide particles is not larger than 100 nm.

5. A combination according to claim 1, wherein step (a) comprises the steps of:
   (1) applying a coating mixture to the glass substrate so as to form a first layer on the glass substrate; and
   (2) heating the first layer.

6. A combination according to claim 5, wherein step (1) is conducted in an atmosphere having a relative humidity ranging from 40 to 65%.

7. A combination according to claim 5, wherein step (1) is conducted at a temperature ranging from 20 to 27° C.

8. A combination of a glass substrate and a multilayered water-repellent film formed on a glass substrate, the film having a first metal oxide layer having a minutely rough surface having on the surface micro-pits and/or micro-projections and a second water-repellent layer, the film being prepared by:

(a) forming the first metal oxide layer on the glass substrate such that the first metal oxide layer has a minutely rough surface having on the surface micro-pits and/or micro-projections;

(b) preparing a coating mixture comprising 0.10–20 wt % of a fluoroalkylsilane, 0.04–2 wt % of tin oxide particles doped with antimony oxide, 0.03–2 wt % of a silicon compound, 0.005–15 wt % of water, an organic solvent and an acid, the molar ratio of the acid to the fluoroalkylsilane being in a range from $5.0 \times 10^{-4}:1$ to $2.0 \times 10^{-2}:1$;

(c) applying the coating mixture to the first metal oxide layer so as to form the second layer on the first layer; and (d) heating the second layer at a temperature ranging from 100° to 400° C.

9. A combination according to claim 8, wherein the micro-pits and/or micro-projections are stable on baking the first metal oxide layer at a temperature ranging from 550° to 650° C.

10. A combination according to claim 8, wherein the average diameter of the micro-pits and/or micro-projections of the first metal oxide layer is in the range of from 5 to 500 nm.

11. A combination according to claim 8, wherein the first metal oxide layer has an average thickness ranging from about 10 to about 300 nm, and wherein the first metal oxide layer's surface is minutely rough such that the values of maximum height (Ry), arithmetical mean roughness (Ra), ten-point mean roughness (Rz) and mean spacing of profile irregularities (Sm) according to Japanese Industrial Standard (JIS) B 0601-1994 are respectively in a range from 5 to 60 nm, a range from 2 to 20 nm, a range from 5 to 55 nm and a range from 5 to 700 nm.

12. A combination according to claim 8, wherein the first metal oxide layer surface is minutely rough such that the value of skewness is in a range not smaller than 0 and that the value of kurtosis is in a range not smaller than 3.

* * * * *